United States Patent
Harper, Jr.

(10) Patent No.: US 9,732,671 B2
(45) Date of Patent: Aug. 15, 2017

(54) METHOD FOR SAFE, EFFICIENT, ECONOMICALLY PRODUCTIVE, ENVIRONMENTALLY RESPONSIBLE, EXTRACTION AND UTILIZATION OF DISSOLVED GASES IN DEEP WATERS OF A LAKE SUSCEPTIBLE TO LIMNIC ERUPTIONS, IN WHICH METHANE IS ACCOMPANIED BY ABUNDANT CARBON DIOXIDE

(71) Applicant: Harper Biotech LLC, Villanova, PA (US)

(72) Inventor: Charles Little Harper, Jr., Villanova, PA (US)

(73) Assignee: HARPER BIOTECH LLC, Villanova, PA (US)

( * ) Notice: Subject to any disclaimer, the term of this patent is extended or adjusted under 35 U.S.C. 154(b) by 279 days.

(21) Appl. No.: 14/730,798

(22) Filed: Jun. 4, 2015

(65) Prior Publication Data

US 2015/0354451 A1    Dec. 10, 2015

Related U.S. Application Data

(60) Provisional application No. 62/007,912, filed on Jun. 4, 2014.

(51) Int. Cl.
*B01D 19/00* (2006.01)
*F01N 3/02* (2006.01)
(Continued)

(52) U.S. Cl.
CPC ............ *F02C 3/22* (2013.01); *B01D 19/0036* (2013.01); *B01D 19/0042* (2013.01);
(Continued)

(58) Field of Classification Search
CPC B01D 19/00; B01D 19/0036; B01D 19/0042; B01D 19/0047; F01N 3/02
(Continued)

(56) References Cited

U.S. PATENT DOCUMENTS 4,149,596 A    4/1979   Richardson et al.
4,199,028 A    4/1980   Caughey
(Continued)

FOREIGN PATENT DOCUMENTS

BE    531780 A    9/1954
DE    2939772 A1    5/1981
(Continued)

OTHER PUBLICATIONS

English language abstract for DE 2939772 A1 (1981).
(Continued)

*Primary Examiner* — Robert A Hopkins
(74) *Attorney, Agent, or Firm* — Caesar Rivise, PC

(57) ABSTRACT

A method and system are disclosed for safe, efficient, economically productive, environmentally responsible, extraction and utilization of dissolved gases in deep waters of a rare type of "exploding" lake, where methane ($CH_4$) is accompanied by abundant $CO_2$. $CH_4$ is combusted to generate electricity. $CO_2$ usually is considered a contaminant requiring removal to avoid power loss. Cleaning high $CO_2$ levels from $CH_4$, however, is costly and causes $CH_4$ loss. Venting $CO_2$ is environmentally undesirable. Or, if $CO_2$ is disposed in water flow returned to the deep lake, danger persists. $CO_2$ and $CH_4$ are degassed efficiently together and input into oxy-fuel combustion. Three process outputs are: degassed nutrients-rich water flow, power and $CO_2+H_2O$ exhaust, all usable for industrially productive purposes. Extracting and using both gases together in an integrated method advances safety, economic productivity and envi- (Continued)

ronmental stewardship. Previously, it has not been possible to accomplish these ends together. The invention provides a hyper-efficient way.

13 Claims, 7 Drawing Sheets

(51) Int. Cl.
*F02C 3/22* (2006.01)
*F23L 7/00* (2006.01)

(52) U.S. Cl.
CPC ........... *B01D 19/0047* (2013.01); *F01N 3/02* (2013.01); *F23L 7/007* (2013.01); *F05D 2260/611* (2013.01); *Y02E 20/344* (2013.01)

(58) Field of Classification Search
USPC .... 95/139, 241, 260, 266; 96/155, 193, 204; 60/311, 398
See application file for complete search history.

(56) References Cited

U.S. PATENT DOCUMENTS

| | | | |
|---|---|---|---|
| 4,235,289 A | 11/1980 | Weeter | |
| 4,261,419 A | 4/1981 | Probstein et al. | |
| 4,262,747 A | 4/1981 | Elliott et al. | |
| 4,279,307 A | 7/1981 | Jones | |
| 4,359,092 A | 11/1982 | Jones | |
| 4,377,208 A | 3/1983 | Elliott et al. | |
| 4,613,338 A | 9/1986 | Rogers et al. | |
| 5,263,322 A * | 11/1993 | Molini | F03G 3/00 60/398 |
| 5,913,363 A | 6/1999 | Paplinski | |
| 8,663,368 B2 | 3/2014 | Wolz et al. | |
| 2005/0072301 A1 | 4/2005 | Baciu | |
| 2009/0223365 A1 | 9/2009 | Morkel | |
| 2011/0265649 A1 | 11/2011 | Lazik et al. | |
| 2011/0272166 A1 | 11/2011 | Hunt | |
| 2012/0038174 A1 | 2/2012 | Bryant et al. | |
| 2014/0000881 A1 | 1/2014 | Player | |
| 2016/0257577 A1 | 9/2016 | Harper, Jr. | |

FOREIGN PATENT DOCUMENTS

| | | | |
|---|---|---|---|
| EP | 2357318 A1 | 8/2011 | |
| FR | 2952054 A1 | 5/2011 | |
| WO | 2008034205 A1 | 3/2008 | |
| WO | 2008086585 A1 | 7/2008 | |
| WO | 2008109971 A1 | 9/2008 | |

OTHER PUBLICATIONS

English language abstract for FR 2952054 A1 (2011).
Coffey (2008). Diet Coke and Mentos: What is really behind this physical reaction? Am. J. Phys., v.76 (6): 551-557.
Eepybird Studios (2006). The Extreme Diet Coke & Mentos Experiments. EepyBird.com: Entertainment for the Curious Mind. Retrieved on Apr. 27, 2017 from http://www.eepybird.com/featured-video/the-extreme-diet-coke-mentos-experiments/.
Griggs (2004). "A Re-Evaluation of Geopressured Geothermal Aquifers as an Energy Resource." Master's Thesis, Louisiana State University. pp. i-82.
Halbwachs, Methane gas. Kivu Lake. Retrieved on Apr. 27, 2017 from http://mhalb.pagesperso-orange.fr/kivu/eg/index.htm.
Halbwachs, Methane gas extraction. Retrieved on Apr. 27, 2017 from http://mhalb.pagesperso-orange.fr/kivu/eg/eg_2a_extraction.htm.
Halbwachs (2014). Limnological Engineering. Slide deck presentation. pp. 1-31. Retrieved on Apr. 27, 2017 from http://moletta-methanisation.fr/diaporama/S54Halbwachs.pdf.
Halbwachs et al. (2004). Degassing the 'killer lakes' Nyos and Monoun, Cameroon. EOS, Transactions AGU, v.85, pp. 281-285.
Henni (2014). Technology could cut CO2 cost sharply for enhanced oil recovery. JPT: Journal of Petroleum Technology, Jun. 2014 technology update. pp. 30 and 32. (Online: https://www.onepetro.org/journal-paper/SPE-0614-0030-JPT).
Huber et al. (2014). Quantifying the soda geyser. J. Chem. Educ. V. 91 (3): 428-431.
Hussain (2001) Vacuum degasifier: Comprehensive modeling and simulation. Vacuum, v. 60, pp. 325-337.
Kapteijn et al. (2012). A Breakthrough Oxy-Fuel Technology for Cost-Effective CO2-Enhanced Oil Recovery. Paper SPE 162541 presented at the Abu Dhabi International Petroleum Exhibition and Conference, Abu Dhabi, UAE, Nov. 11-14: pp. 1-9.
Kapeteijn et al. (2011). "Tri-Gen, an innovative oxy-fuel technology to convert high CO2 gas reserves into power." IGRC Conference, Seoul, Oct. 19, 2011. pp. 1-21.
Marsden (1993). A survey of natural gas dissolved in brine. pp. 383-400. In: The Future of Energy Gases. United States Geological Survey Professional Paper 1570. Editor: D. G. Howell.
Marsden (1979). Natural gas dissolved in brine—a major energy resource of Japan. Soc. Petrol. Eng. Annual Fall Meeting paper. SPE8355. pp. 1-7.
Marsden et al. (1965). Suiyoseitennengasu—A special type of Japanese natural gas deposit. American Association of Petroleum Geologists, v.49, No. 3, pp. 286-295.
Moran (2010). Carbon dioxide degassing in fresh and saline water. I. Degassing performance of a cascade column. Aquacultural Engineering, v. 43, pp. 29-36.
Moran (2010). Carbon dioxide degassing in fresh and saline water. II. Degassing performance of an air-lift. Aquacultural Engineering, v. 43, pp. 120-127.
Oosterdijk et al. (2012). Lake Kivu: Turning threat into prosperity. TCE, The Chemical Engineer, issue 852, Jun. 2012, pp. 32-35.
Rodríguez-Rodríguez et al. (2015). Generation of microbubbles with Application to Industry and Medicine. Annual Review of Fluid Mechanics, v.47, pp. 405-429.
Rodríguez-Rodríguez et al. (2014). Physics of beer tapping. Physical Review Letters 113 (21), 214501.
Rosen (2015) Lake Kivu's great gas gamble. Technology Review, Apr. 16, 2015. Retrieved online on Apr. 27, 2017 from http://www.technologyreview.com/photoessay/536656/lake-kivus-great-gas-gamble/.
Tassi et al. (2009). Water and gas chemistry at Lake Kivu (DRC): Geochemical evidence of vertical and horizontal heterogeneities in a multibasin structure. G3: Geochemistry, Geophysics, Geosystems, v. 10(2), DOI: 10.1029/2008GC002191. pp. 1-22.
Tietze (2000). Lake Kivu Gas Development and Promotion-Related Issues: Safe and Environmentally Sound Exploitation. Final Report to the Ministry of Energy, Water and Natural Resources Unit for Promotion and Exploitation of Lake Kivu Gas. pp. 1-110.
Tietze (2007). Basic plan for monitoring, regulating and steering exploitation of the unique methane gas deposit in Lake Kivu: Safely, Environmentally soundly and with optimal yield. Copyright, PDT GmbH / Dr Klaus Tietze, Celle, Germany. pp. 1-201.
Wikipedia; Diet Coke & Mentos. Wikipedia entry: Retrieved online on Apr. 6, 2017 from http://en.wikipedia.org/wiki/Diet_Coke_and_Mentos_eruption.
Wuest et al. (2009). Modelling the reinjection of deep-water after methane extraction in Lake Kivu. EAWAG Report (Kastanienbaum, Switzerland). pp. 1-141.
Wuest et al. (2012). Methane Formation and Future Extraction in Lake Kivu. In: Descy, J-P., Darchambeau, F., Schmid, M., 2012 (editors). Lake Kivu: Limnology and Biochemistry of a Tropical Great Lake. Springer. pp. 165-180.
Harper, Jr., U.S. Appl. No. 15/058,756, filed Mar. 2, 2016.

* cited by examiner

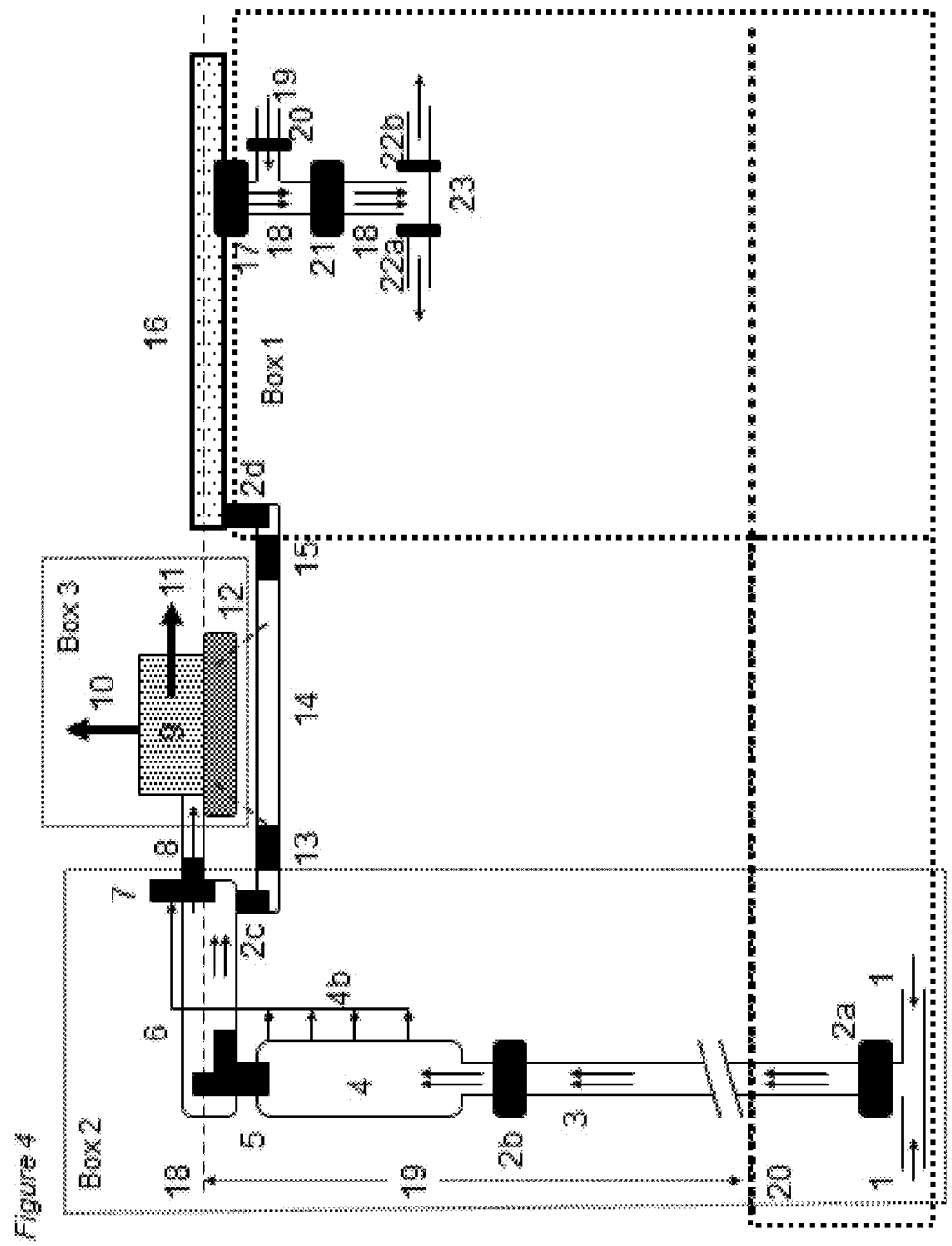

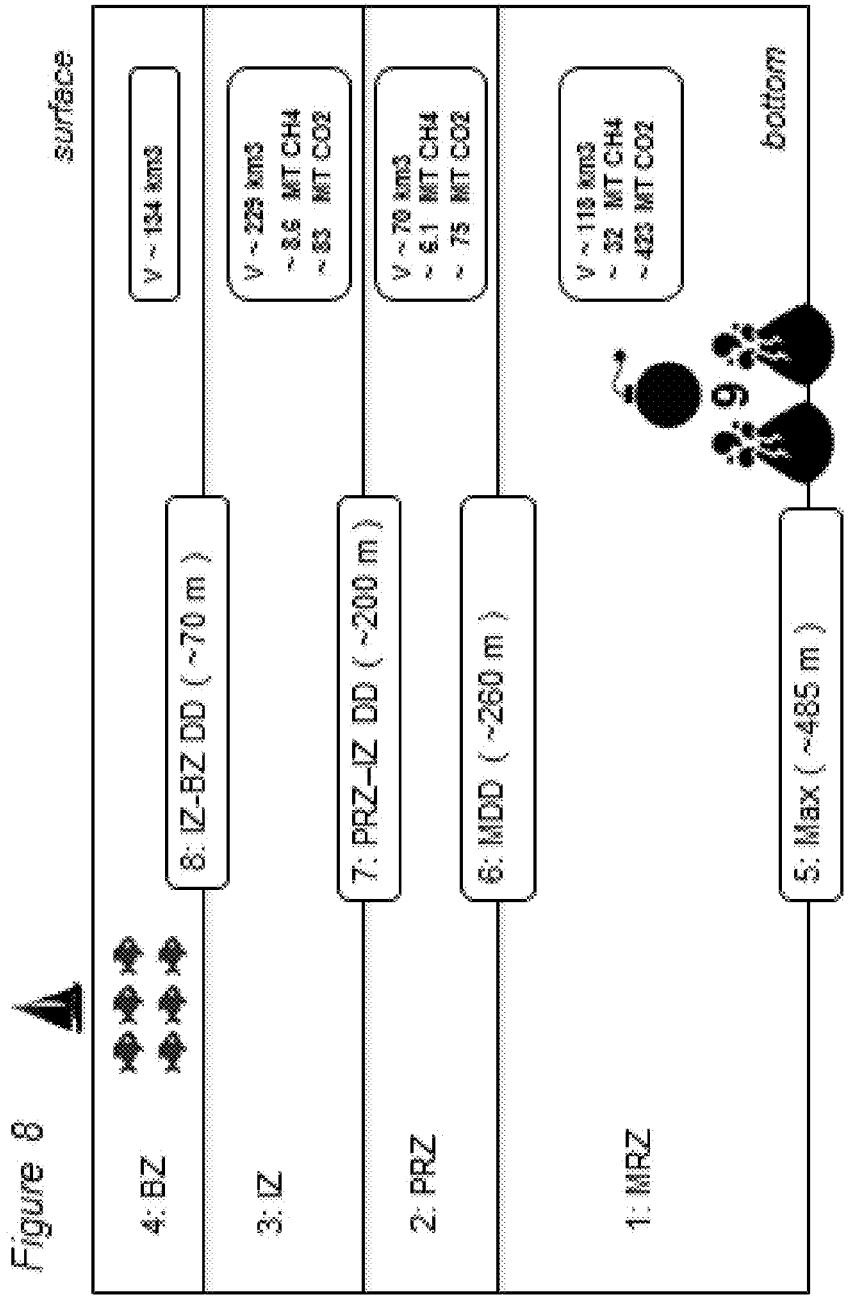

METHOD FOR SAFE, EFFICIENT, ECONOMICALLY PRODUCTIVE, ENVIRONMENTALLY RESPONSIBLE, EXTRACTION AND UTILIZATION OF DISSOLVED GASES IN DEEP WATERS OF A LAKE SUSCEPTIBLE TO LIMNIC ERUPTIONS, IN WHICH METHANE IS ACCOMPANIED BY ABUNDANT CARBON DIOXIDE

BACKGROUND OF THE INVENTION

1. Field of Invention

The invention relates to methods, systems and apparatus for safe, effective, responsible, efficient extraction and utilization of Lake Kivu deepwater resources.

2. Description of Related Art

Lake Kivu is a lake in the center of Africa shared by the Republic of Rwanda and the Democratic Republic of Congo. Lake Kivu contains abundant dissolved gas in its depths. Lake Kivu's main methane reserve is below 250 meters where dissolved methane ($CH_4$) of about 32 million tons (approximately 1.5 trillion cubic feet, TCF) is present along with dissolved carbon dioxide ($CO_2$) of about 423 million tons (Tietze, 1978, 1980a,b; Wuest et al., 2009, 2012; Tassi et al. 2009). Dissolved deepwater gas below 250 meters has a molar ratio: $CO_2/CH_4$ ~4.8. Lake Kivu's deepwater also is nutrient-rich (Tassi et al. 2009). Descy et al., (2012) provides overview perspectives on Lake Kivu. Some other lakes exist that are broadly of this type, as described by Issa et al., (2013). However, these lakes are much smaller and less interesting economically compared to Lake Kivu.

Lake Kivu deepwater methane has been used used for electric power production, but many problems exist and many substantial opportunities for additional resource utilization have not been realized.

Demand for electrical power is expanding rapidly in the region of Lake Kivu. As untapped hydropower resources are limited in the region, rapidly increasing electric power demand has been provided by banks of generators consuming expensive diesel fuel imported from the East African coast with power costs sometimes exceeding US \$0.44/kWh. This trend burdens local economies. It is a pressing matter, for example, in the case of Rwanda's fast-growing economy, where a Government agenda has been to expand power generation capacity by close to a factor of four in two years' time remaining to meet a longstanding 2017 goal. High cost power is unattractive to the kinds of new businesses required to boost Rwanda into higher levels of industrial business activity needed to sustain jobs growth and higher per capita GDP.

This deepest and most methane-rich resource zone in Lake Kivu is called the "Main Resource Zone" (MRZ). The trapped gas resource in the MRZ, ~32 million tonnes of methane, in principle has the capability to provide approximately 1,000 megawatts continuous power over a period of 30 years if extracted and combusted with high efficiency. With conventional methods, however, only roughly half as much power will be available due to several inefficiencies.

Additional natural gas of roughly 6 million tonnes is present in Lake Kivu trapped in another, higher level, convectively isolated, layer. This layer is situated between 260 and 200 meters depth. It is is called the "Potential Resource Zone" (PRZ). Even more methane, approximately 8.6 million tonnes, is trapped above the PRZ in a zone known as the "Intermediate Zone" (IZ). The IZ exists in the depth interval 200 m to ~80 m. Above 80 meters is an oxygenated water zone called "bio-zone" (Wuest et al., 2009). All zones below the bio-zone are anoxic and convectively stable and isolated with respect to the surface.

It is highly desirable to develop methods to generate power efficiently from PRZ methane and, if possible, from IZ methane also.

The presence of an estimated approximately 500 million tonnes of associated $CO_2$ trapped at depth in Lake Kivu in the MRZ and PRZ presents a major extraction efficiency challenge. Methane typically cannot be combusted efficiently in the presence of large amounts of $CO_2$. Precombustion separation of $CO_2$ by various differential extraction and gas-cleaning technologies requires substantial power production efficiency loss as well as large capital investment in equipment. A staged system based on the differential gas solubility of $CH_4$ and $CO_2$ in water at different pressures has been used thus far in Lake Kivu by all power projects, and is described on the website of Dr. Michel Halbwachs (Halbwachs, website). This method results in substantial methane losses in return flow water from all stages. It is incapable of extracting methane from the PRZ or IZ. And it typically requires substantial fractional internal process power utilization taken from the overall power production.

The presence of so much $CO_2$ trapped at depth in Lake Kivu presents a threat of mass asphyxiation mortality from a possible very large scale convective runaway "limnic eruption." (Sigurdsson et al., 1987; Kling et al., 1987; Tietze, 1992; Zhang, 1996; Schmid et al., 2004, 2005; Zhang and Kling, 2006). Mass asphyxiations from smaller scale limnic eruptions in volcanic lakes in Cameroon have been described by Baxter et al., 1989; Tietze 1992; Eby et al., 2006; Costa and Chiodini, 2015; and Kling, undated) A future event in Lake Kivu could be triggered by lake bottom volcanism in the northern sector of the lake where bathymetric surveys have revealed the presence of several volcanogenic cones on the deep lake bottom. Scientific study of sediment cores from Lake Kivu have revealed evidence of past convective runaway events in the lake. These appear to have been triggered by volcanic activity according to the evidence found in these cores (Ross, 2013a,b; Hecky and Reinthal, 2010; Ross et al., 2013, 2014, 2015).

The last convective such gas release event in Lake Kivu was roughly 1,000 years ago. Deepwater trapped gas has accumulated since then into a present situation that is potentially triggerable by lake bottom volcanic activity.

Two small Cameroonian lakes of the $CO_2$-rich "exploding" type have been degassed in order to make them safe by construction of auto-siphoning fountains which operate continuously (Halbwachs et al. 2004). These lakes, however, do not contain large and valuable methane resources such as Lake Kivu does.

The existence of a very large resource of dissolved methane trapped at depth in Lake Kivu was discovered in 1935 and reported in 1937 by Damas. Confirmation was obtained by Schmitz and Kufferath (1955). Strategy for utilization of the resource on a grand scale was discussed at length by Borgniez (1960).

The Union Chimique Belge (UCB) designed, constructed and operated a small gas extraction and processing plant on the Cap Rubona peninsula south of Gisenyi in Rwanda during the period 1954-1971 (Tietze, 2000; Halbwachs website). This venture was the focus of a 1957-1958 film, "Le Gaz Methane du Lac Kivu" (Capart et al., 1958). The degassing technology for this venture was disclosed in 1954 in (Belgian patent) BE 531780A, cited in EP 2367318 A1

(Halbwachs 2011. "Installation d'extraction d'un gaz dissout dans l'eau en grande profondeur.").

The UCB design utilized a staged process, a first stage being shallow (~20 meters) preferential degassing of gas enriched in $CH_4$ and de-enriched in $CO_2$ relative to total dissolved abundances, followed by a near and/or above surface water washing stage in which the resulting gas is further enriched in its relative abundance of $CH_4$ by a process of $CO_2$ absorption into $CO_2$-undersaturated surface-derived water. The resulting gas composition was approximately 80% $CH_4$ (Bikumu, 2005; Painted diagram displayed on the site of the defunct plant on Cap Rubona, a photo of which appears on the website of Halbwachs.). The technology was innovative and effective for its time and purpose. However, the method was not designed to avoid slip losses of methane in its various $CO_2$ separation-cleaning stages. Nor was it designed to contribute towards improved lake safety. Nor was it designed to utilize $CO_2$ productively.

This general type of water-staged process is described by Michel Halbwachs (on his website) and by Klaus Tietze (in two reports: 2000, 2007), and is additionally disclosed in US 2009/0223365 A1 by Morkel in 2003, ("The treatment of water containing dissolved gases."). DE2939772 A1 (1979. Mueller. "Verfahren zur gewinnung von in wasser geloestem nutzgas sowie eine vorrichtung zur durchfuehrung des verfahrens"; English translation: "Water dissolved gas collection—in expansion vessel near water level on top of riser.") discloses improvements in the extraction of Lake Kivu methane in the context of such a water-staged process.

The Belgian UCB water-staged process has been modified in various ways for gas production projects subsequent to the UCB project which was ended in 1971. These include the "KP-1," pilot platform and electric power utility station presently operating on Cap Rubona, owned and operated by the Government of Rwanda, known as UPEZGAZ (Unité pour la Promotion et l'Exploitation du Gaz du Lac Kivu, and also as the Kibuye Power Company (Pasche et al. 2010).

The Cap Rubona location also was used by a venture that successfully tested pilot equipment designed and implemented by M. Halbwachs and colleagues in ~2008 and 2009 (Halbwachs 2014). The technology design of this project is detailed on M. Halbwachs' website. It follows the water-staged $CO_2$ removal design principles pioneered by UCB.

M. Halbwachs has proposed and implemented solutions to the problem of extracting methane gas from bodies of water of large depth, such as Lake Nyos or Lake Monoun in Cameroon (Halbwachs et al. 2004). These systems were open-top auto-siphoning venting pipe fountains created for $CO_2$ venting for purposes of lake safety.

M. Halbwachs also disclosed a method for a process improvement within the general design of the Belgian (UCB)-type water-staged technology as described herein: FR 2952054, EP 2357318 and http://mhalb.pagesperso-orange.fr/kivu/eg/eg_2a_extraction.htm. Specifically, EP 2357318 A1 (Halbwachs. 2011. "Installation d'extraction d'un gaz dissout dans l'eau en grand profondeur"; English translation: "System for obtaining a gas dissolved in water at great depth.") discloses a degassing catalyzing addition to promote degassing and auto-siphoning power in the water-staged process invented and demonstrated by UCB.

The general design of the "KivuWatt" project, intended to produce 25 MW of continuous power on a piloting basis, follows the UCB-initiated water-staged technology for $CO_2$ extraction with the main aspects of design focused on removing $CO_2$ from methane. (KivuWatt's technology design is shown on Antares Offshore LLC website. Further information has been published by Osterdijk and Hoencamp 2012; and Rosen, 2015, and is present on the Contour Global website.)

US 20090223365 A1 (Morkel) discloses a method and apparatus for the treatment of water containing a percentage of dissolved gases in order to recover at least some of the gases from the water. The invention is applicable to Lake Kivu. It is a method for a process improvement upon and within the general design type of the Belgian (UCB)-type water-staged technology.

Prior systems used to obtain methane for power production from Lake Kivu deep water have suffered from a variety of problems.

Power plant systems used to combust methane in order to produce power typically have required a purity constraint on the carbon dioxide content of methane gas supplied into combustion. These purity constraints typically have required carbon dioxide levels very much lower than in the bulk dissolved gas in the deep lake of the special type described herein ($CO_2/CH_4$ ~4.8, molar ratio). A typical upper limit constraint has been to supply gas into power plant engines only with contaminating carbon dioxide content lower than 40% (mole fraction), that is: $CO_2/CH_4<0.67$, (molar ratio). Therefore the task of $CO_2$ scrubbing is a major matter for the extraction and utilization of methane present in Lake Kivu deepwater. The challenge of efficient $CO_2$ scrubbing has dominated the basic design of UCB-type degassing systems applied to methane extraction from Lake Kivu deep water for power production.

Prior methods depend upon processes that degas methane under hydrostatic pressure at depth in a process where the deep water is made to flow upwards in riser pipes past the gas saturation exsolution "bubble line" depth to reach specified depths underwater to undergo degassing and gas-capturing stages in one or more degassing chambers. These chambers separate gas from water and capture the gas component that is transported in one or more pipes to the surface for further gas processing. Methane is far less soluble in water than is carbon dioxide. Therefore, methane reaches saturation at a depth well below that of carbon dioxide, even in the case of water with very high dissolved $CO_2/CH_4$ ratio, as in the case of Lake Kivu deep water. Therefore differential exsolution under hydrostatic pressure at depth favors differential $CH_4$ degassing relative to carbon dioxide degassing. Hence exsolved gas is obtained at depth with a $CO_2/CH_4$ ratio lower than in the deep water. Depths in the range of 20 meters have sometimes been used in Lake Kivu for this process, where for comparison the gas saturation line may occur at about 130 meters for up-flowing deep water obtained in the Main Resource Zone (MRZ).

The performance of this process is fundamentally dependent upon the depth of removal of the degassed gas and is variable and dependent upon both equilibrium, chemical and kinetic factors acting through a specific degassing system design in the overall behavior of gas transfer from a dissolved state to an exsolved state. The variability of the process has two aspects: one being the $CO_2/CH_4$ ratio, and the other being the $CH_4$ extraction efficiency defined as the fraction of gas extracted from the total amount of dissolved gas present in the intake flow. These factors are correlated with increasing depth: decreasing $CO_2/CH_4$ ratio, (which is desirable), is correlated with decreasing $CH_4$ extraction efficiency, (which is not desirable), and represents wastage of a limited and extremely valuable resource for economic development.

In some such prior methods, the gas obtained by degassing at depth is further scrubbed of carbon dioxide by a second stage process of water dissolution washing known as "water washing" whereby $CO_2$ is preferentially re-dissolved into water that is unsaturated in $CO_2$. Water washing typically involves a bubble column tower design whereby the gas to be processed for additional removal of carbon dioxide is bubbled up through pumped water obtained from the near surface. As surface water is highly undersaturated in carbon dioxide, this water washing process utilizes differential gas solution: carbon dioxide present in the gas being cleaned (of $CO_2$) preferentially re-dissolves into the surface water which is then returned to the lake. Unfortunately, some $CH_4$ also is re-dissolved into the washing water flow and is lost as further slip. Overall, slip losses of methane in such processes can be substantial, certainly in excess of 15%, and can be as high as 50%, or even higher.

Methane-rich natural gas dissolved in water has long been extracted from various types of subterranean aquifers by the simple method of drilling wells to allow such water containing a dissolved gas resource to rise to the surface either by pumping or natural pressure flow. Degassing of such methane-rich natural gas resources existing at depth under hydro-pressure follows depressurization whenever the concentration of methane present in the rising water exceeds solubility conditions. Natural gas typically is present and is degassed as a mixture of gases, with methane ($CH_4$) typically being the desired molecular substance and with other gases such as, for example, carbon dioxide ($CO_2$) being considered as contaminants. If the degassed natural gas is sufficiently free of contaminants, then the methane may be used directly for industrial purposes such as electric power production. If not, various gas cleaning procedures may be utilized. Economic viability can be dependent upon costs associated with such gas cleaning, as well as with costs associated with return pumping of degassed waters back to subterranean depth or, alternatively, surface disposal.

The existence and development of such resources of drillhole-accessed water-dissolved methane has been reviewed by Docherty (1981), Marsden (1993) and Griggs (2002). For example, the Japanese company Godo Shingen Sangyo Co., Ltd., has produced methane by this fluid up-flow degassing method since 1957 utilizing subsurface brines present in Japan. This work in Japan has been documented by Marsden (1979) and Marsden and Kawai (1965).

A recent disclosure of a method for dissolved methane extraction from deep brines is: US 2014/0000881 A1 (Player. "Process for extracting dissolved methane from hydropressured aquifers and for returning degassed brines via spent water injection wells.") Additional earlier related disclosures include: US 2012/0038174 A1 (Bryant. "Storing carbon dioxide and producing methane and geothermal energy from deep saline aquifers."); US 2011/0272166 A1 (Hunt. "Separation under pressure of methane from hot brine useful for geothermal power."); U.S. Pat. No. 5,913,363 (Paplinski. "Method for downhole separation of natural gas from brine with injection of spent brine into a disposal formation."); U.S. Pat. No. 4,613,338 (Rogers. "Separating gases from geopressurized or hydropressured brine."); U.S. Pat. No. 4,377,208 (Elliot. "Recovery of natural gas from deep brines."); U.S. Pat. No. 4,359,092 (Jones. "Method and apparatus for natural gas and thermal energy production from aquifers."); U.S. Pat. No. 4,279,307 (Jones. "Natural gas production from geopressured aquifers."); U.S. Pat. No. 4,262,747 (Elliot. "In situ recovery of gaseous hydrocarbons and steam."); U.S. Pat. No. 4,261,419 (Probstein. "Underground recovery of natural gas from geopressured brines."); U.S. Pat. No. 4,235,289 (Weeter. "Method for producing carbon dioxide from subterranean formations."); U.S. Pat. No. 4,199,028 (Caughey. "Enhanced recovery with geopressured water resource."); U.S. Pat. No. 4,149,596 (Richardson. "Method for recovering gas from solution in aquifer waters."). None of these disclosures involving the extraction of methane from deep brines include solving a problem of high levels of accompanying $CO_2$ as an aspect of their method.

Disclosures of other related methods for removal of methane dissolved in other geofluids include: U.S. Pat. No. 8,663,368 B2 (Wolz. "Process and apparatus for removing methane or another fluid from a fluid mixture."); US 2005/0072301 A1 (Baciu. "Procedure and apparatus for collection of free methane gas from the sea bottom.") Neither of these disclosures involving the extraction of methane from geofluids include solving a problem of high levels of accompanying $CO_2$ as an aspect of their method.

Disclosures of other related methods for removal of methane and other gases dissolved in waterway waters are: US 2011/0265649 A1 (Lazik. "Device and method for remediating and separating gas accumulations in waterways."); WO2008086585 A1 (Takeshi Imai. "Gas-collecting hood and water bafflers for use in hydroelectric power plants for capturing methane from deep waters."); WO2008109971 A1 (Takeshi Imai. "Process for capturing methane from the deep waters of hydroelectric power plants, using inflatable floating hoods, integrated with the cryogenic liquefaction of methane for river transportation."); WO20088034205 A1 (Imai Takeshi. "Collecting and dehumidifying system of methane gas from deep waters of lakes, dams or rivers, applicable to hydroelectric plants, water catchment for cities, metropolis, irrigation canals.") None of these disclosures involving the extraction of methane from waterway waters include solving a problem of high levels of accompanying $CO_2$ as an aspect of their method.

Accordingly, there is a pressing need for a new method to extract and utilize the trapped deepwater gases of Lake Kivu in an efficient manner that also increases safety. Environmental responsibility additionally encourages the design of any such new method efficiently to facilitate industrially productive and valuable ways to utilize very large amounts of $CO_2$ rather than to vent it into the atmosphere.

All references cited herein are incorporated herein by reference in their entireties.

BRIEF SUMMARY OF THE INVENTION

Accordingly, the invention comprises a method comprising the steps of: (a) extracting methane gas and carbon dioxide gas from a body of water to obtain extracted gases and degassed water; (b) feeding the extracted gases as a fuel into an oxyfuel power generation system; (c) generating power from the oxyfuel power generation system; (d) expelling an exhaust from the oxyfuel power generation system, wherein the exhaust comprises carbon dioxide and water vapor; and (d) replacing the degassed water into the body of water.

In certain embodiments, the exhaust is recycled to industrial use.

In certain embodiments, the danger of the body of water is decreased thus increasing human safety in proximity to the body of water.

In certain embodiments, the oxyfuel power generation system includes an air separation unit.

In certain embodiments, the body of water has a $CO_2/CH_4$ ratio greater than 4, and more than 98 wt. % of the $CH_4$ dissolved in the water is extracted by the extracting step.

The invention further comprises a system configured to perform the method of the invention. The system comprises: (a) a water degassing system; (b) a oxyfuel power generation system; and (c) a return flow system.

In certain embodiments, the water degassing unit comprises: (i) an intake pipe system; (ii) at least one bubble capture unit positioned upwards along a system of degassing pipes; (iii) at least one degassing catalyst unit positioned further upwards along the system of degassing pipes; (iv) a bubbly flow turbine configured to capture and recycle power from jetting foam flow at a top of the system of degassing pipes, wherein bubbly flow turbine is also configured to function as a foam separator; (v) at least one vacuum degassing unit positioned at the top of the system of degassing pipes; and (vi) a water flow turbine capturing and recycling power in a downward outflow of degassed water from the vacuum degassing unit.

In certain embodiments, the oxyfuel power generation system comprises a power generator and an air separation unit configured to provide oxygen for combustion.

In certain embodiments, the return flow system comprises: (i) an outflow pipe from the degassing system; (ii) pipe systems connecting flow to any water treatment systems; (iii) a return flow pipe system and horizontal diffuser to reinject degassed water into the body of water at a specified depth; and (iv) flow control valve systems with emergency shut-off capabilities.

In certain embodiments, the system further comprises flow connection by pipes and channels to and from any surface water treatment systems that decrease water density in the degassed water flow, and an inlet system configured to allow admixture of relatively low density near-surface water from the body of water into the return flow for reinjection at a specified depth.

In certain embodiments, the system further comprises a system configured for combustion preparation processing and transfer of degassed gas into the oxyfuel power generation system.

In certain embodiments, the system further comprises a control system configured for physical monitoring, system-wide functional integration and emergency response safety assurance.

In certain embodiments, the system is configured to extract more than 98 wt. % of the $CH_4$ dissolved in a body of water having a $CO_2/CH_4$ ratio greater than 4.

BRIEF DESCRIPTION OF SEVERAL VIEWS OF THE DRAWINGS

The invention will be described in conjunction with the following drawings in which like reference numerals designate like elements and wherein:

FIG. 4 is a schematic view in a vertical plane similar to FIG. 2, but showing an alternative embodiment.

FIG. 8 is a schematic vertical plane view of Lake Kivu's convectively stable density structure with its three gas-trapping resource zones with discontinuity boundaries labeled, and water volumes and gas contents specified.

DETAILED DESCRIPTION OF PREFERRED EMBODIMENTS OF THE INVENTION

Figure 1:
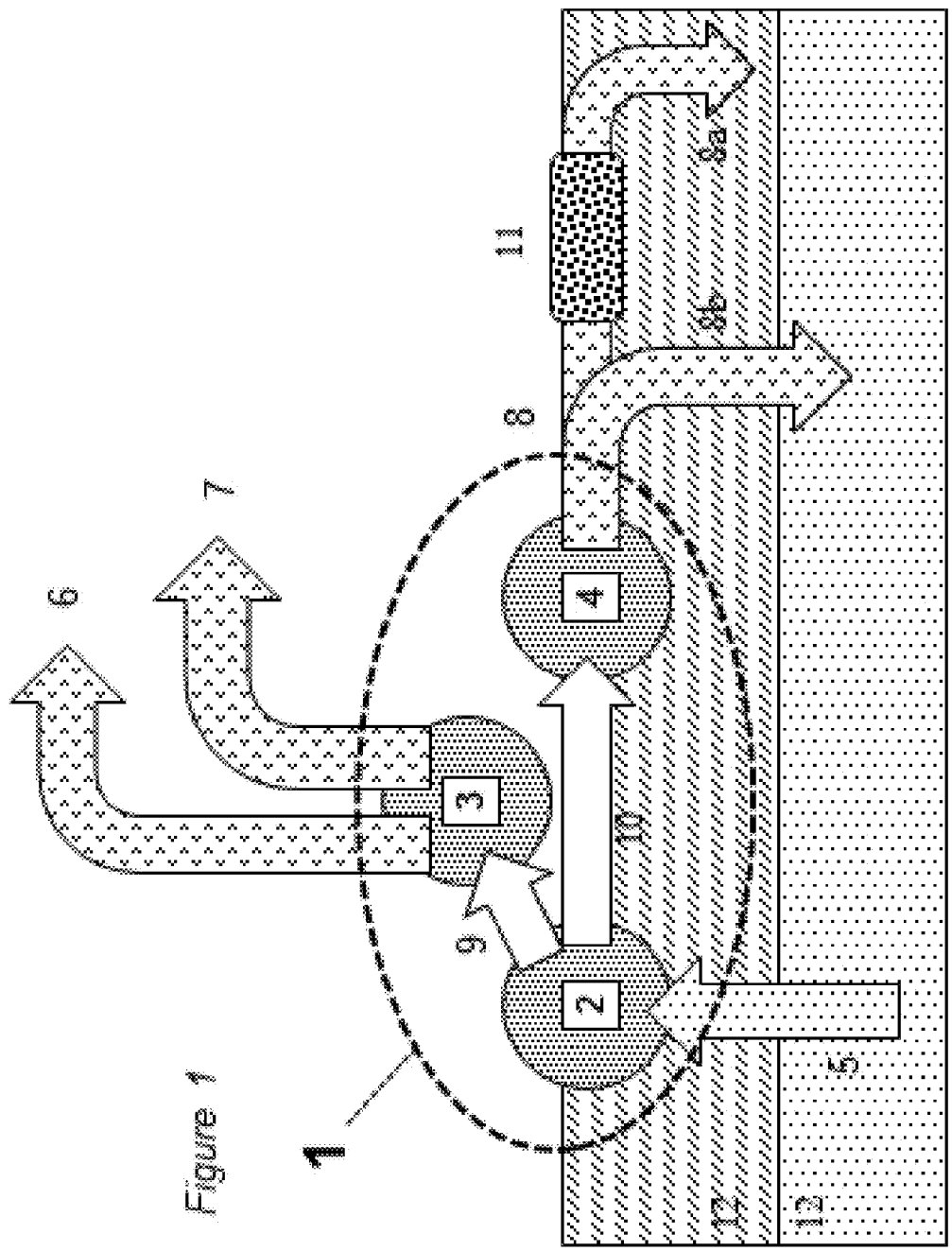
FIG. 1 is a schematic view of an embodiment of a method and system of the invention.

The invention disclosed herein relates to utilizing natural gas and other resources dissolved in water, and more particularly to the extraction and utilization for electric power production of $CH_4$ and $CO_2$ gas from $CO_2$-rich water, with additional desirable ends: waste avoidance; power production efficiency; the securing of human safety against catastrophic mass asphyxiation from eruptive lake degassing; and creating conditions of post-combustion exhaust useful for efficient industrial carbon capture utilization (CCU).

In particular, the invention relates to the problem of efficiency optimization in gas extraction and utilization for high-volume low-cost power production, constrained by responsibilities of human safety and ecological stewardship (Tietze, 2000, 2007, Wuest et al 2009, 2012), as well as by challenges to maximize the creation of valuable marketable products from all available resources, especially resources previously considered to be waste. The invention also relates to creating a method to combine technologies in such a way to solve extraction efficiency and power use problems presented by the extremely high levels of associated $CO_2$ in Lake Kivu gas trapped at depth.

The invention also relates to a particular pro-environment focus on the deployment of industrial carbon capture and utilization (CCU) on a very large scale. Indeed, the invention disclosed herein opens up an opportunity to demonstrate CCU on the largest scale in the world. The invention also relates to the utilization of valuable resources present in the deepwater, other than methane and carbon dioxide, and the optimization of ways to use all potentially valuable resources in concert with ways that maximize job creation and other aspects of economic development in the region and that demonstrate environmental stewardship and that pioneer profitable (therefore market-scalable) innovation in this important arena of green technology and business.

The invention disclosed herein is a method that combines three distinct technology sub-packages, or technological functions, together into an integrated technological package in a specific way designed for the conditions of the rare type of lake, of which Lake Kivu is the economically most interesting case by far, and does so in order to accomplish and optimize important problem-solving ends together: increasing lake safety, efficiency/productivity and environmental stewardship/innovation. The invention creates a solution to several major challenges in the industrial utilization of Lake Kivu deepwater using its resources: (i) it provides a mode for efficient degassing that avoids wastage of the limited methane resource; (ii) it provides a way to produce power efficiently from extracted methane; (iii) it provides a basis for industrially productive $CO_2$ utilization, and (iv) it provides a way to increase lake safety over time and offers a path to the vital goal of removing mass-scale danger from catastrophic gas release entirely.

The invention disclosed herein has been created in contradistinction to all forms of existing implemented technology for gas extraction and utilization from Lake Kivu.

The invention disclosed herein offers a solution that is totally distinct from related prior art and disclosures involving systems designed for extracting and purifying deepwater gas from Lake Kivu. All prior art and disclosures of this type aim to provide $CO_2$-cleaned, methane-enriched, natural gas for power production and industrial process heating. The present invention avoids the need for $CO_2$ removal from $CH_4$ in the gas extraction process.

The invention comprises a method and system for efficient and safety-enhancing extraction and utilization by means of combustion of dissolved deepwater gases, in particular methane with accompanying carbon dioxide. The invention will be particularly useful for extracting such gases from Lake Kivu and any other bodies of water having similar extremely rare and unusual properties, to increase lake safety and to produce electrical power as well as industrially useful exhaust in a chemical form optimal for efficient carbon capture utilization. The nature of the invention can be understood, as illustrated in FIG. 1, in terms of transformation of an input into three outputs. The input is a rare and unusual type of natural resource. Three useful desirable outputs (as shown labeled 6, 7, 8) are obtained by combining and integrating three sub-methods, sub-systems or processes (shown as items 2, 3 and 4) together into a single method (shown inside the boundaries of the oval marked 1). This method and system is suitable for specific application to conditions present in the rare type of "exploding" lake described herein, particularly Lake Kivu.

The invention in particular is especially applicable to Lake Kivu. For reference, FIG. 8 shows the density-stratified structure of the gas-trapping resource zone layers of Lake Kivu. Labels are: Main Density Discontinuity (MDD: 6); Main Resource Zone (MRZ: 1); Potential Resource Zone (PRZ: 2); Intermediate Zone (IZ: 3); Bio-zone (BZ: 4). Gas resource amounts are given in million metric tonnes (MT). Water volumes (V) are given in units of cubic kilometers (km3). The figure illustrates Lake Kivu's near-surface oxic bio-zone layer (BZ), beneath which exist three anoxic gas-trapping resources zones (RZs: 1, 2, 3). The figure shows dissolved gas amounts, inter-layer density discontinuity (DD) boundaries, and their positional depths (6, 7, 8) at the present time.

FIG. 8 also shows the source of natural danger in the lake from an eruption-triggered convective runaway "limnic eruption." This is represented symbolically (9). Danger results from a combination of massive amounts of dissolved gas at depth combined with lake bottom volcanic activity evidenced by volcanic cones present at great depth (9). These cones are associated with, and provide evidence of, active rifting and axial sheet dyke emplacement of $CO_2$-rich magmas under the lake bottom and penetrating into the water mass within the gas-rich Main Resource Zone (MRZ).

As shown in FIG. 1, the combined method or system (bounded by a dashed oval, 1) integrates three aspects, sub-methods, or sub-systems. These are: (i) a degassing aspect or sub-method or sub-system; (2) a power plant aspect or sub-method or sub-system; and (3) a return flow reinjection aspect or sub-method or sub-system; (3). The combination organizes its constituent parts in concert with an integrated function to transform one input (item 5: gas-rich deepwater) into three outputs (item 6: electric power; item 7: industrially usable $CO_2+H_2O$ exhaust; and item 8: fully degassed water), doing so in an efficient manner that promotes safety, industrial productivity, and innovative environmental stewardship for $CO_2$ utilization. A desired increase in human safety proceeds over time in a density-stratified lake (item 12, shown for simplicity in vertical plane view with only two layers), out of which gas-rich deepwater flows (item 5), and into which degassed water is returned by a return flow system (item 4). Degassed water flow output (item 8) follows two possible reinjection modality options: "push-down" (8a) of de-densified deepwater, and resource zone dilution (8b). Item 11 represents a water de-densifying system of any type.

The natural resource input shown in FIG. 1 is an extraction and degassing of gas-rich deepwater such as, for example, the composition of water in Lake Kivu's Main Resource Zone (FIG. 8: 1: MRZ) below 250 meters depth, documented by Tassi et al (2009), and Wuest et al., (2009, 2012), containing abundant dissolved $CH_4$ and $CO_2$, plus plant nutrients and other useful substances.

The first output is electric power (FIG. 1, item 6) generated in an efficient manner utilizing an advanced oxy-fuel turbine technology. Efficiency noted in this context combines three different factors: (i) avoiding $CH_4$ "slip" waste by inefficient process capture of the natural methane resource due to $CO_2$ separation technologies; (ii) avoiding gas processing energy costs to remove $CO_2$ prior to combustion; and (iii) achieving high overall "thermal efficiency" energy conversion in oxy-fuel combustion turbine generator systems.

The second output is a post-combustion exhaust stream of $CO_2$ that is pure except for accompanying water vapor easily separated by condensation (FIG. 1, item 7). Because of its purity, this form of output exhaust is attractively utilizable for various carbon capture and utilization (CCU) industrial production processes such as can be developed usefully in the context of the specific conditions of Lake Kivu.

The third output is a density-controlled, post-degassing flow of degassed nutrient-rich water suitable for various productive and safety-enhancing uses prior to reinjection into the lake (FIG. 1, item 8). A return flow of fully degassed water importantly contributes to the reduction of risk of life-threatening limnic eruption. A method for modifying the density of this return flow water output to optimize lake safety simultaneously with economic productivity has been disclosed by the Inventor in U.S. Provisional Patent Application No. 62/126,874.

Figure 2:
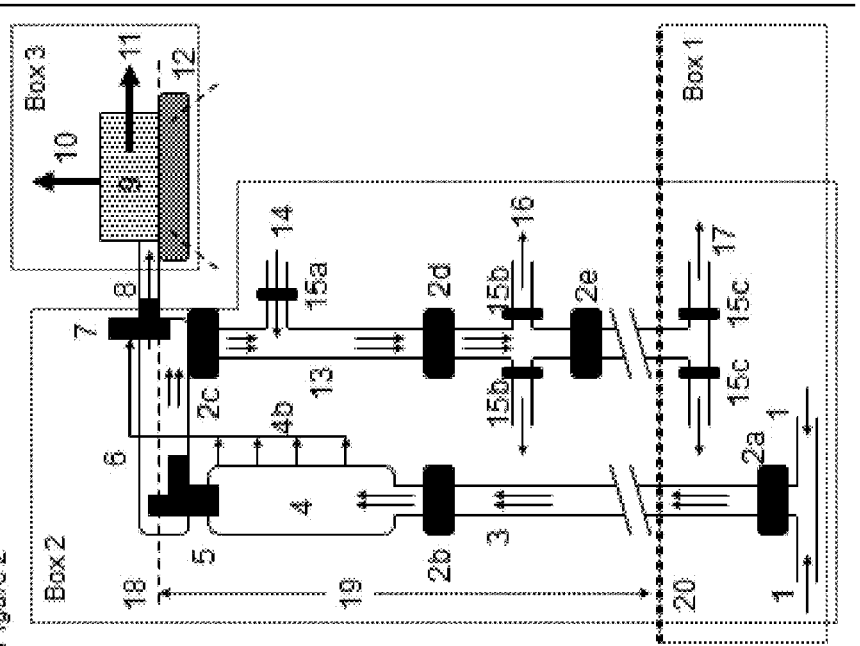
FIG. 2 is a schematic view in a vertical plane showing an embodiment of a method and system of the invention in three aspects (sub-methods or sub-systems), each shown within a box of dashed lines.

FIG. 2 exhibits both possible water reinjection modalities as shown in FIG. 1 by the output flow (8) arrows (8a,b) of that figure (FIG. 1). These modalities are: shallow reinjection with "push-down" of gas-rich layers below the point of reinjection (8a), and deep reinjection with resource zone dilution (8b). In FIG. 2, these options are shown by horizontal reinjection diffusers labeled 16 (with control valves, 15b) and 17 (with control valves 15c), respectively. The functioning of the shallow reinjection system (17) for density-matching requires surface water admixing via intake pipe 14 with control valve 15a which additionally may include a pump.

Figure 3:
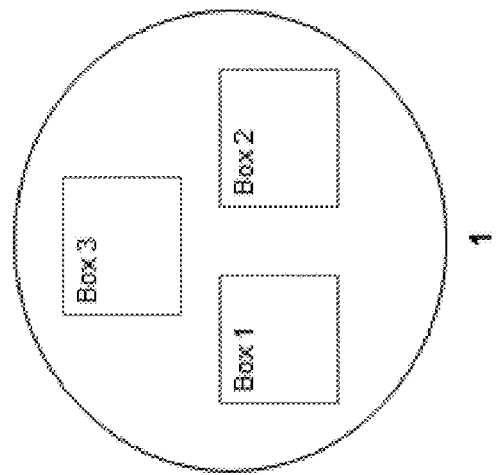
FIG. 3 is a conceptual schematic summary view representing the common integrated three-part aspect of the two distinct embodiments shown schematically in FIG. 2 and FIG. 4.

FIG. 3 shows the method of the invention as an integration of three sub-methods or sub-processes (similarly as illustrated in FIG. 1). FIG. 3 shows the system integration as shown in both FIG. 2 and FIG. 4, wherein each sub-method or sub-process is contained within one of three boxes. FIG. 3 shows the integration represented as a circle (1) containing three boxes, each referring to the sub-methods or sub-systems contained within numbered boxes indicated in FIG. 2 and FIG. 4, (these boxes being identified by identical corresponding labels as: Box 1, Box 2, Box 3).

FIG. 4 shows an embodiment different than that shown in FIG. 2, but unified in the common method of the invention shown in both FIG. 1 and additionally illustrated in FIG. 3. (The unification of boxes shown in FIG. 3 refers jointly to subsets of three boxes containing sub-methods or sub-systems as shown in both FIG. 2 and FIG. 4.)

FIG. 4 shows the mode of "push down" return flow via a pipe and diffuser system (18, 23) with control-safety valves (17, 21, 22a,b). In this embodiment, a substances-removing de-densification means of water processing is utilized additional to de-densification by admixture of near surface water with intake shown as item 19, and with valve and pump control shown as item 20. De-densification by substances removal is accomplished by a surface bio-system, shown as item 16, with associated flow transfer components: 13, 14 and 15.

The invention disclosed herein includes a sub-component that extracts gas from deepwater according to a "total degassing" aim, thereby seeking to be efficient in removing both $CH_4$ and $CO_2$ together with high efficiency, while also capturing both gases for industrial utilization. In simplest form, such technology follows long and broadly utilized general degassing technologies well known to those skilled in the art, for example as described by Hussein (2001) for vacuum degasifiers, as well as for non-vacuum cascade column $CO_2$ degassers by Moran (2010a,b). The particular embodiment of this type of degassing technology required within the invention requires gas capture and preparation for entry into combustion rather than simple venting of vacuum pump output.

The invention disclosed herein includes a conceptual design for a high efficiency degassing system created specifically for Lake Kivu's conditions with gas feed into an oxy-fuel turbine system. Information is provided herein such that a person sufficiently skilled in the art of the design of such a custom type of degassing system created for Lake Kivu conditions could create an effective design and implement it in creating a well functioning system, specifically in terms of inclusion of core functional components described in the conceptual design.

Figure 5:
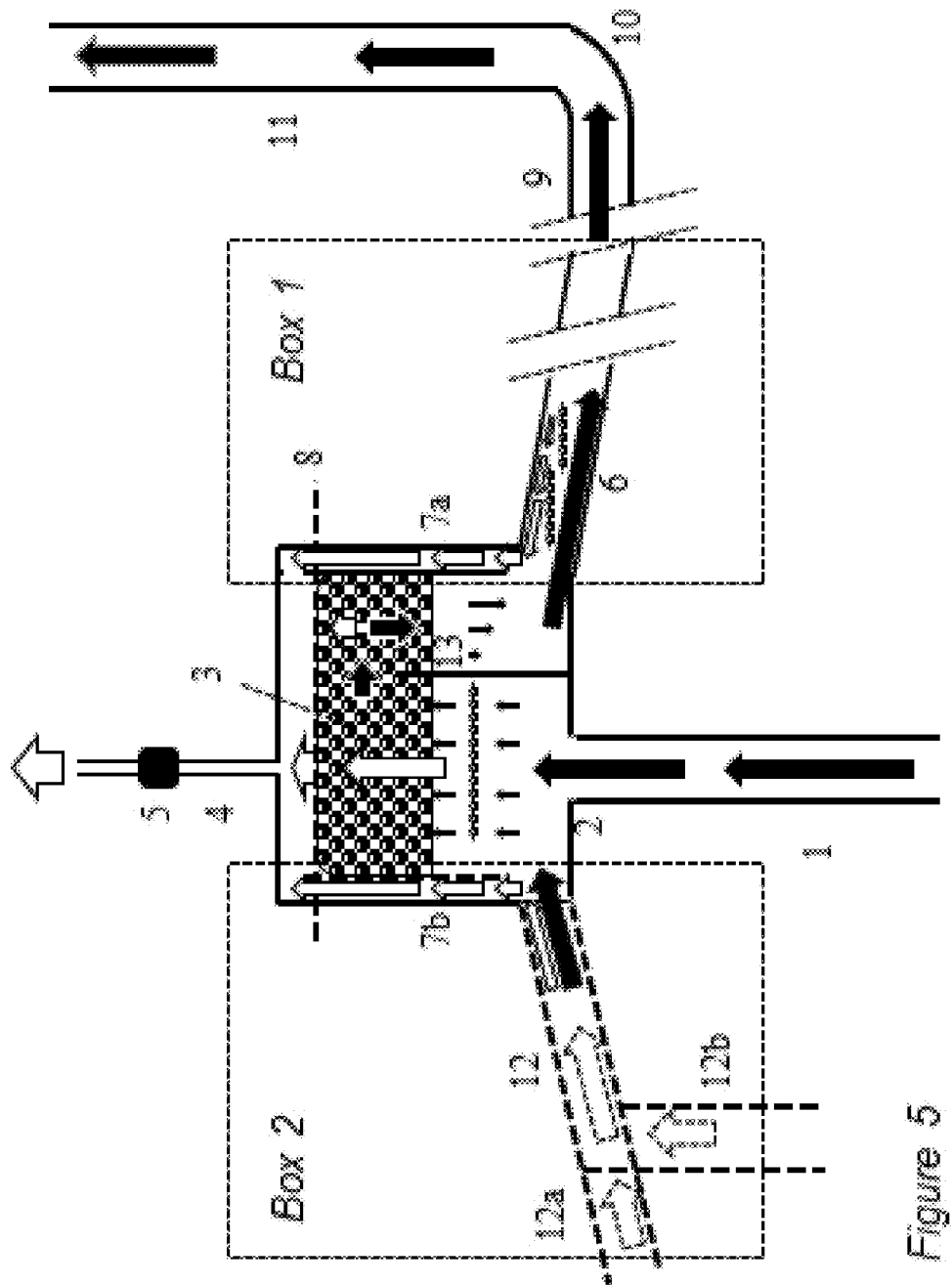
FIG. 5 is a schematic view of two methods and types of bubble capturing gas/water separation system connecting to each other as well as to pipe upflow and exit flow systems. Two marked boxes show different orientations or in-series options of connection between the two methods and types of bubble capturing gas/water separation.

FIG. 5 is a schematic viewing of a gas/liquid separator (item 2) combining two distinct bubble capture-separation technologies: (i) a bubble trap for microbubbles utilizing fluid flow through a packed bed (item 3) such as may contain either ordinary bed packing materials, or specialized packing materials with catalyst degassing surface properties, and (ii) a bubble trap for large bubbles utilizing a simple sloped pipe system. The latter is shown both for counter-flow (6,7) and with-flow situations (box 2 and item 12).

Figure 6:
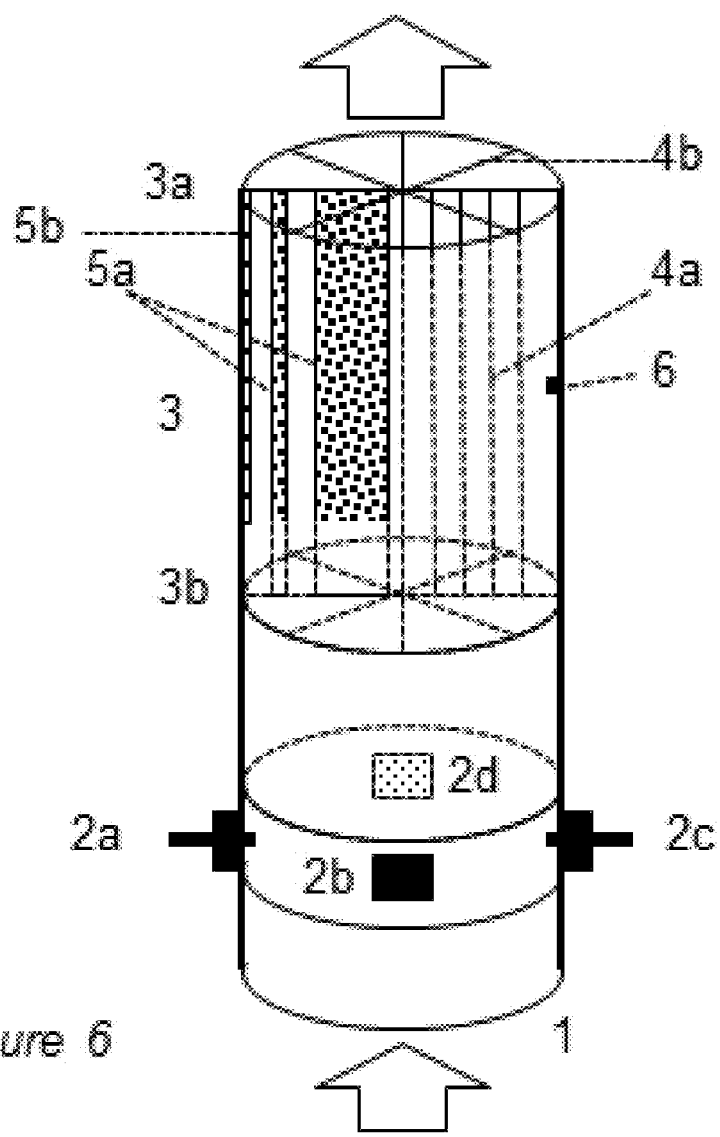
FIG. 6 is a schematic view of two distinct degassing catalyst methods or systems situated within a pipe containing an upwelling de-pressurizing flow.

FIG. 6 shows two distinct methods for the nucleation of degassing. These have the purpose to be deployed under conditions of gas saturation dominated by carbon dioxide in an upflow pipe, and to avoid supersaturation leading to the initiation of degassing higher up in the flow than necessary, thus wasting kinetic energy available for use. However, the use of these systems is generic and can be applied, if needed, to catalyze methane degassing under conditions of gas saturation dominated by methane. Specific methods represented in the diagram are: (i) laser and/or ultrasound nucleation via transmission ports (2a,b,c,d), and (ii) suspension (3, 3a,b) of catalyst degassing surfaces on wires or an array of wires (4a,b) or on posts (6) and/or on strips or sheets (5a,b), which may be suspended in the flow and/or attached to the inside surface of the flow pipe as shown. The purpose of these devices is to nucleate degassing runaway cascade reactions. Such nucleation cascade processes are described by Rodríguez-Rodríguez, J. et al (2014), and by associated supplemental materials, including illuminating online videos and an online lecture.

The invention disclosed herein combines a "total degassing" sub-method (FIG. 1, item 1) together with a sub-method of return flow water handling and treatment for reinjection (FIG. 1, item 4) of totally degassed (hence also $CO_2$-degassed) water back into the lake with density-matching of the return flow exiting the diffuser to the density of the layer wherein the return flow is being injected into horizontally. (For example as shown in FIG. 2 via diffusers labeled 16, 17, and in FIG. 4 via a diffuser labeled 23.) The invention is not limited to a specific modality of reinjection such as deep reinjection with resource zone dilution, or shallow reinjection of de-densified water effecting deflation and "push-down" of deep gas-rich layers. In the latter case, the invention is not limited to a specific modality for water de-densification such as surface water admixture or excess-density-causing substances removal, or both together.

Processes combined together into the disclosed method and conceptual design are: (i) efficient up-flow depressurization-degassing of the deepwater in an auto-siphoning process accomplishing "total degassing" and from which buoyant energy can, if desired, be extracted in order to decrease the total process energy used by vacuum pumping if vacuum pumping is utilized; (ii) efficient oxy-fuel combustion of the two main components of the degassed gas ($CH_4$ & $CO_2$), unseparated; and (iii) return flow reinjection of fully degassed water with density-matching.

The inventive method accomplishes four ends that are not accomplished efficiently by prior methods, either individually or jointly. These ends are: (i) efficient (>98%) extraction of methane dissolved in the deep water source; (ii) efficient power generation using gas extracted from Lake Kivu; (iii) outputting $CO_2$ from the combined system in a form favorable for efficient and productive carbon capture utilization (CCU); and (iv) near total (>90%) degassing of $CO_2$ so that the return flow of water is in a fully degassed condition, thus contributing importantly over time to securing human safety against a massive-scale catastrophic threat from a limnic eruption.

In particularly preferred embodiments, the present invention is directed towards effective, efficient and dynamic development of the unique resources of Lake Kivu in a win-win way that makes the lake safe from catastrophe over time and also maximizes the productivity of the limited resource available: avoiding waste and inefficiency while creating new opportunities for the development of valuable greentech and biotech productivity adjunct to electrical power generation.

The method disclosed herein differs completely from previous methods. It is designed to limit slip loss of methane to less than 2% in the most preferred embodiment, or less than 5% or less than 10% in less preferred embodiments. It is not a modification. It follows a completely different logic of design. It does not employ differential gas exsolution at all, or any water washing $CO_2$ removal stage. It does not seek to avoid carbon dioxide degassing. The method disclosed herein welcomes carbon dioxide degassing as a vital contribution to human safety on a massive scale. It is a method of total degassing to generate a gas flow into combustion to produce power efficiently without any necessity whatsoever for carbon dioxide avoidance. The combustion in-feed in this method uses total gas, which only may require removal of trace hydrogen sulfide gas ($H_2S$) by ordinary methods well known to those skilled in the art of producing natural gas.

Specifically, the method disclosed herein is a combination of sub-methods, technologies or systems which, once combined, create a gas extraction and power-producing integrated system of high efficiency that contributes importantly to human safety and that can supply a purified flow of carbon dioxide into carbon capturing bio-production processes and other $CO_2$ utilizing industrial production processes.

As shown in FIG. 1, the invention comprises an integration or combination (contained within the dashed oval 1) of three combined and integrated aspects (sub-methods). This conceptual representation shows how the invention creates the capability to transform one specific input type into three specific output types. The input, gas-rich and nutrient-rich deepwater (5), is transformed into three outputs: (i) electric power (6); (ii): $CO_2+H_2O$ exhaust (7); and (iii) degassed return flow water (8a,b). This transformation is effected by the combination of aspects or sub-methods 2, 3 and 4. Aspect or sub-method 2 is an up-flow "total" degassing gas extraction system. Aspect or sub-method 3 is an oxy-fuel power generation system. Aspect or sub-method 4 is a return flow water handling and reinjection system. These aspects or sub-methods act in concert according to their inter-relations and system interconnections. (Note that an additional input of atmospheric air into an air separation unit within item 2, the oxy-fuel power generation system, is explicitly included but not shown as an input.) Flows for degassed gas (9) and degassed nutrient-rich water (10) between sub-systems (2, 3, 4) are shown as straight unshaded arrows. Return flow is shown in two option modes, shallow "push down" or deep "resource zone dilution" reinjection, as arrows 8a and 8b, respectively.

In FIG. 2, different reinjection flow options are shown by exit flow pipe diffusers 16 (shallow reinjection), and 17 (deep reinjection). FIG. 4 also shows an embodiment with a shallow "push down" mode of return flow reinjection. A de-densifying water treatment system also is identified in FIG. 4 in item 16 represented as an extended surface system. (In FIG. 1, item 11 corresponds to a de-densifying water treatment process system of any type.) This water treatment system (FIG. 4, item 16) is connected to the water degassing unit (box 2) and to the return flow unit (box 1) with water transport system involving control valves (items 2c and 2d), and pumps (13, 15), if and as needed for water flow transport across a distance (14), as shown. Such a surface-extended (bio-)system for de-densifying water treatment is disclosed elsewhere by the inventor and is not included in the invention disclosed herein.

For the task of extracting energy from the unusual type of lake methane deposit described above, a combination of a total degassing process with an oxy-fuel power plant (including an associated air-separation $O_2$ production plant: both are shown together as item 9 in FIG. 2) creates efficiency by means of a novel and non-obvious combination. This is because the separation of carbon dioxide from methane with very high associated carbon dioxide (for example with $CO_2/CH_4$ molar ratio>0.5) uses a great deal of energy and additionally involves substantial methane slip losses. New types of oxy-fuel turbine power plants solve this problem, as they can burn such very-high-$CO_2$ degassed gas directly (without $CO_2$ removal and with water vapor present) with very high output energy production efficiency. Electric power output is shown in FIG. 2 and FIG. 4 as arrow 10.

For the task of utilizing the hyper-abundant $CO_2$ present in Lake Kivu deepwater, a combination of a total degassing process with an oxy-fuel power plant creates efficiency by means of a novel and non-obvious combination. The oxy-fuel combustion process exhausts a combination of $CO_2$ and condensable water vapor. The $CO_2$ in the exhaust of such a power plant in the context of Lake Kivu is a combination mixture of a majority input of $CO_2$ from the deep lake with a minority input of $CO_2$ created by combustion of $CH_4$ with $O_2$. Therefore, oxy-fuel combustion offers a way to separate Lake Kivu's $CO_2$ from its $CH_4$ by a post-combustion mode rather than by a pre-combustion mode. A $CO_2+H_2O$ exhaust stream output avoids the typical flue gas separation problem. Such an exhaust stream is trivially convertible into essentially pure $CO_2$ by condensation of water vapor. Exhaust of this type, pre- or post-condensation, can be used efficiently in many industrial processes demonstrating carbon capture utilization (CCU). It is shown as output arrow 7 in FIG. 1. Exhaust also is shown in FIG. 2 and FIG. 4 as arrow 11. The novel and non-obvious combination disclosed herein shows how Lake Kivu gas extraction and utilization can provide a very large scale platform for the practical demonstration of industrially productive and environmentally responsible CCU, while at the same time making Lake Kivu safe by degassing its $CO_2$, and at the same time efficiently combusting its $CH_4$ to produce electric power.

Embodiments of the invention can be envisioned as a combination of three processes or sub-methods with an additional consequent aspect, or sub-method, designed as a benefit to create a vital increase in human safety for peoples living in the region of a body of water containing the trapped gases at depth. The two processes of (i) degassing and (ii) combustion with power and exhaust production, are illustrated in FIGS. 2 and 4, by containment within boxes 2 and 3, respectively. The safety benefit from deep lake degassing is illustrated in FIGS. 2 and 4, boxes labeled 1, where extraction of deep gas-rich water in the lake is compensated by reinjected return flows of degassed water.

FIG. 2, box 1 provides a schematic description of the deep water source zone for methane and carbon dioxide. Within box 1 are an intake flow system (item 1), and a return flow system by means of horizontal diffusers (item 17). Removal of both methane and carbon dioxide gas from this deepwater zone over time is the desired result of the overall operation of the fully integrated system for the purposes of advancing human safety against the possibility of a catastrophic limnic eruption. FIG. 4, box 1 shows an alternative embodiment with a shallow-type return flow reinjection of degassed water that causes downward deflation-migration of gas-rich deepwater layers in the lake. The same type of "push down" return flow option is shown in FIG. 2 by the shallow diffuser option for return flow shown as item 16 (with density control by intake of surface water and mixing via an intake pipe marked as item 14).

FIG. 2 and FIG. 4 exhibit horizontal separation in the location of degassing pipe systems (items 1, 3, 4, 5, 6 and connections) and a floating (or alternately on-land) platform supporting power plant systems (shown as box 3 in both figures). This is an important safety feature. Horizontal separation avoids a possible sinking catastrophe for a floating platform in the case of a system failure in the degassing system releasing a large bubble plume. Inclusion of this safety feature within the schematic representations shown in FIG. 2 and FIG. 4 is prudent. However, horizontal separation should not be construed to be specified as an included feature of the invention disclosed herein. Excluding this feature recognizes that it has been a previous practice in actually implemented equipment in Lake Kivu to place floating platforms supporting industrial equipment directly over deep degassing pipe systems. One case of platform sinking may have been a consequence.

FIG. 2, box 2 and FIG. 4, box 2 provide schematic views of the systems integration design for a total degassing process or sub-method. Total degassing is a process designed to optimize the removal of both major gases, methane and carbon dioxide, together. Total degassing obtains optimal efficiency in methane extraction by minimizing 'slip' losses. Total degassing also optimally removes gases from deep water that typically and/or predominantly will be returned to a deep layer location in the deep lake, thereby enhancing human safety against the threat of limnic eruption.

Total degassing yields a high-carbon dioxide and methane bearing gas with a composition close to that of the dissolved gas present in the deep water. The design intention of the total degassing process or sub-method is to avoid two types of methane loss: methane loss from partial degassing of methane from the deep water, and methane loss from re-solution methane into methane-undersaturated surface and near surface water utilized in any second water washing carbon dioxide scrubbing stage, if applied.

Both forms of methane loss from partial methane degassing and from methane re-solution are categorized by practitioners of the art of natural gas extraction and processing as "slip." The term "total degassing" used here additionally refers to degassing of both gases (methane and carbon dioxide) with optimized extraction for both and minimized and approximately wholly avoided slip (that is, reduced to less than 2% of total). As noted above, it also refers to the avoidance of loss of methane in the combined process of degassing followed immediately within the overall degassing process of gas water washing to remove carbon dioxide in the flow of extracted natural (bio-)gas.

FIG. 2, box 3 and FIG. 4, box 3 provide schematic views of platform-situated (12) oxy-fuel turbine power generation systems (items 9), which can combust gas obtained from the total degassing systems shown inside box 2 in both figures. This system (items 9) includes either an air separation unit (ASU), of any design, in order to provide oxygen ($O_2$) for oxy-fuel combustion, or a different type of separation unit obtaining oxygen from processing of oxygen-rich gas obtained from carbon-capturing photosynthetic processes employed in the production of bio-products. Degassed gas provided by degassing systems is further processed as needed to remove hydrogen sulfide gas and excess water vapor, and transferred to the oxyfuel turbine system (items 12) by a system of one or more pipes (items 8).

Oxy-fuel combustion engines obtain oxygen required for combustion from an air separation unit (ASU) or from any other method for obtaining either pure oxygen or mixtures of oxygen plus carbon dioxide.

The invention disclosed herein includes a sub-component that combusts mixtures of $CH_4$ and $CO_2$ with $O_2$ to generate electric power and that, after combustion, expels an exhaust comprised of nearly pure mixtures of $CO_2$ plus condensable water vapor. Systems doing so are known as oxy-fuel turbine generators. These systems incorporate air separation units to provide nearly pure O2 for oxy-fueling.

Commercial oxy-fuel power generation systems exist in the oil and gas industry under the name "TRIGEN" (Kapteijn et al., 2012; Henni, 2012). These systems are represented for use in combustion of high-$CO_2$ natural gas from gas fields to produce power, and also for combusting $CO_2$-contaminated gas from enhanced oil recovery operations (EOR) in order to produce power. Public information regarding these systems indicates that very high and close to optimal efficiency combustion is possible with input gas conditions in the range of Lake Kivu deepwater (~93% $CO_2$ and ~7% $CH_4$ by mass fraction).

High-$CO_2$ natural gas obtained by a total degassing process is combusted without prior $CO_2$ removal processing. $H_2S$ may be removed by various means well known to practitioners of the art. Combustion for power generation utilizes an oxy-fuel power generation process that utilizes $CO_2$ and/or $H_2O$ plus $CO_2$ mixtures for its turbine working fluid.

The oxy-fuel power plant can be placed on land or on top of a moored floating platform as shown in FIG. 2 and FIG. 4, item 12. It produces electric power (item 10) and a carbon-capture-utilizable outflow (item 11) of nearly pure carbon dioxide gas and condensable water vapor, $H_2O$.

The general systems integration design for the total degassing system process or sub-method is as shown in FIG. 2. The level of the lake water surface is shown by a horizontal dashed line (item 18). The level of the main density discontinuity serves as the most important aspect of stability against catastrophic convection-degassing of the gas-bearing layer in the deep lake. This level is shown by a horizontal line (item 20) at a depth (or vertical distance, item 19) between lines 18 and 20. This level is not fixed. It is mobile in two aspects. First, it inflates or moves upward naturally over time by the influx of dense salt-bearing hydrothermal flows entering Lake Kivu at the location of several deep springs. Second, it can be moved downwards by deflation of the deep water layer associated with the gas extraction process. Deflation is accomplished by extraction of deep water at intake (item 1) followed by density dilution by addition of water using intake pipe (item 14) and pump-valve combination (15a) at an intermediate depth, here unspecified, with a controlling valve system (items 15a, 15b, 15c), which can control return flow to be directed back into the lake above the main density discontinuity level (denoted by a line at the top of Box 1) by a shallow level reinjection return flow exit system (item 16), rather than by return flow exit system (item 17) positioned below the main density discontinuity level (in this case avoiding deflation of the deep layer). An alternate way to realize such an option requiring de-densification of the return flow is shown in FIG. 4 as a second preferred embodiment. FIG. 1, item 11 and FIG. 4, item 16 corresponds to a de-densifying water treatment process system. Such a system is disclosed elsewhere by the inventor and is not included herein.

The total degassing system shown in FIG. 2, box 2 includes depth variability control units combined together with flow-shut-off safety system values. These are shown as 2a, and 2b on the up-flow pipe (item 3), and as 2c, 2d, and 2e on the return flow down-flow pipe (item 13). Depth variability control uses pipe extenders and pipe contractors. Similar control systems are shown in FIG. 4 as 2a and 2b on the up-flow pipe (item 3), and as items 17 and 21 on the return flow down-flow pipe (item 18).

The degassing system subcomponents shown in FIG. 2 and FIG. 4 include an up-flow pipe (item 3) and a staged of pipe system (item 4) with options for multiple level removal of degassing gas integrated into a system of gas removal pipes (item 4b). The degassing system subcomponents also include a foam separator system (item 5) for separating degassing gas from water with additional energy recovery if desired by flow turbines. A final stage degassing chamber (item 6) is located at the surface and may be assisted by vacuum pumping in one or more stages. An integrated vacuum pumping and gas transfer pumping system is shown as item 7, delivering total degassing gas into a gas transfer pipe (item 8).

The return flow system shown in FIG. 4 shows a return flow pipe (item 18) with a reinjection diffuser (item 23) with valve controls (items 22a and 22b). (Compared to a 2-dimensional representation, a full 3-dimensional reinjection diffuser system may have a disk-like structure.) The return flow system also includes a surface water admixing port option (item 19) with combined valve and pump control (item 20).

The invention disclosed herein includes a sub-component that returns water flow after degassing to certain depths functioning to direct return flow back into the lake. In its simplest form, such technology follows long and broadly utilized general water flow control technologies involving pipes, flow control valves, storage reservoirs, horizontal flow diffusers, and pumps if necessary. These devices and their combination are known to those well skilled in the art.

Lake Kivu is a rift lake existing within the geographic depression of a lava-dam and graben drop block combination in a tectonically active situation linked with extremely active volcanism to the north of the lake, also on the northern boundary of the lake, and also under the lake in the northern sector where bathymetry reveals many volcanic cones at various depths including depths exceeding 400 meters, which is well into the danger zone for triggering of a limnic eruption. Safety with respect to a possible catastrophic release of trapped deep gas from the lake is an extremely serious matter potentially effective the lives of more than 2 million people living in close proximity to the lake. The invention disclosed here is designed specifically to increase and eventually secure the long-term safety of Lake Kivu. The design aims to decrease the probability of a limnic eruption triggered at depth by energetic release of gases, heat, pumice and lavas associated with ongoing tectonic rifting and deep dike emplacement known sometimes to be associated with local surface volcanism (Wauthier et al., 2012).

The invention disclosed herein increases lake safety by "total" degassing of $CO_2$ from deepwater extracted for industrial purposes. A "total degassing" method stands in contradistinction to existing technologies of the "Belgian type" as created by UCB in the 1950s, all of which which export $CO_2$ back into the deep lake as a consequence of the $CO_2$ separating function of its first stage process of differential degassing at depth. Carbon dioxide is the dense toxic and asphyxiating gas agent known to have killed roughly 2,000 persons in Cameroon in 1984 and 1985 by two limnic eruptions of volcanic crater lakes which are very small relative to Lake Kivu and to the scale of its deepwater gas accumulation.

The invention disclosed herein increases lake safety by return flow reinjection of post-degassing deepwater back into Lake Kivu with its dissolved $CO_2$ content having been fully degassed.

The engineering of return flow water reinjection may follow two different general logics. These are: (i) deep reinjection causing resource zone dilution; and (ii) shallow reinjection causing deflationary "push down" of the density-stacked layered structure of Lake Kivu's main gas-containing deepwater resource zones, the Main Resource Zone (MRZ, 485 m to 260 m) and the Potential Resource Zone (PRZ, 260 m to ~200 m) above it. (For information on resource zones in Lake Kivu, see FIG. 8.)

The engineering of water reinjection in a stable manner requires density matching of reinjected water to the density of the host layer water is being injected into. (Wuest et al., 2009 and Wuest et al., 2012 provide overviews.) Therefore shallow reinjection requires de-densification of post-degassing deepwater prior to reinjection. This may be accomplished by two modalities, separately or in combination. The first is by admixture of near surface water into the flow prior to reinjection. The second is by removal of dissolved substances that cause excess density relative to that of near surface water. (See Tassi et al., 2009 for density structure information in relation to water chemistry for Lake Kivu.) The invention disclosed herein is not limited to the option of deep reinjection with resource layer dilution or to the option of shallow reinjection with "push down." The invention disclosed herein also is not limited to a specific means for de-densification in the case of shallow reinjection. The invention in its broadest aspect includes within its combination of sub-methods the method of $CO_2$ degassing followed by $CO_2$-degassed water reinjection into the lake.

Figure 7:
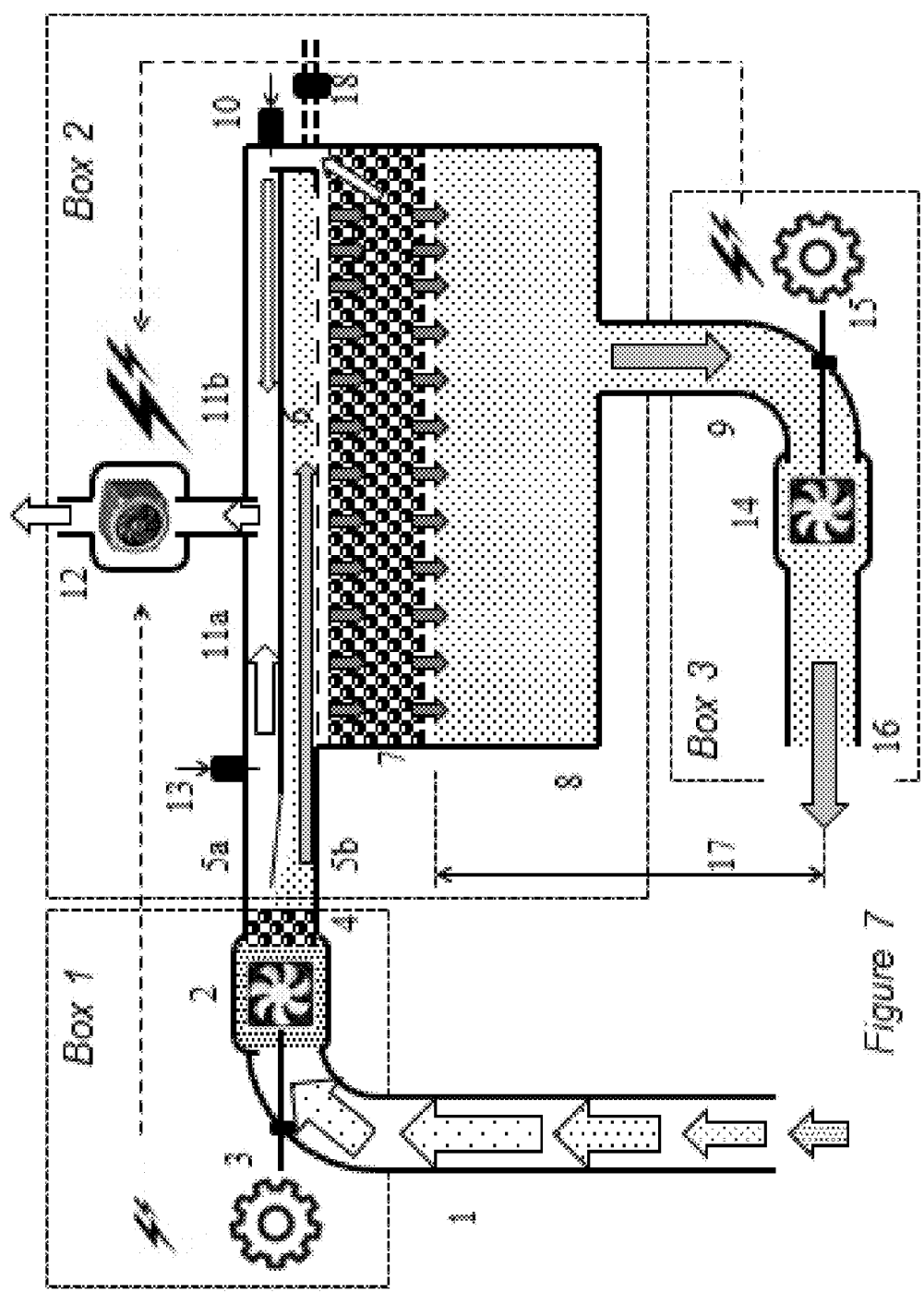
FIG. 7 is a schematic view of a conventional packed bed vacuum degasifier system (2) with inlet of an upwelling, de-pressurizing, foam jet of degassing gas-rich deepwater. The full system as illustrated is bounded by, and incorporates, two integrated turbine power generators: one positioned at the top inlet (item 2 in box 1) acting in part as a foam-fractionator, and the other at the bottom water flow outflow (item 14 in box 3).

Components comprising the total degassing system are shown in additional detail in FIGS. 5, 6 and 7, all in vertical plane view.

Deepwater from Lake Kivu has sufficient bubble-buoyancy to drive auto-siphoning up-flow. Auto-siphoning up-flow of deepwater from Lake Kivu generates surface fountaining of at least about two meters. This has been well demonstrated by experiments (for example: Halwachs, website: http://mhalb.pagesperso-orange.fr/kivu/eg/eg_2b_phenomene.htm). Therefore pumping is not required for up-flow to the surface by a simple straight pipe, though a more complicated system will be more efficient for high efficiency CH4 extraction.

A main design aim in the degasser is to accomplish an effective total degassing of the gases present in the up-flow, in particular of methane, and to limit process use of electrical energy obtained from the power generator to obtain clear advantage such as, for example, a limit of 3% generated energy use if the result was to extract a residually dissolved additional 6% of total $CH_4$. "Total" degassing is defined in practical rather than exact terms as extraction of equal to or more than 98% of $CH_4$ and equal to or more than 90% of $CO_2$ degassed. It also is recognized that the specific definition of $CO_2$ degassing is practically ill-defined for depth-sourced aqueous solutions that are pH variable upon degassing and that contain substantial concentrations of metal cations present that complex with the bicarbonate anion ($HCO_3^-$), namely $Na^+$, $K^-$, $Mg^{++}$ and $Ca^{++}$. Lake Kivu deepwater is rich in these cations and contains abundant bicarbonate anion when degassed (Tassi et al., 2009).

The up-flow and degassing apparatus for total degassing as defined herein utilizes a deep extraction pipe leading to a chamber system that may or may not be vertical, but that in its overall action will transport water, bubbles and degassed gas upwards from intake ports at depth up to the surface and/or near-surface environment. The total degassing apparatus will include one or more degassing and/or gas-liquid separation chambers. Top-level chambers will involve vacuum pumping and therefore can be described as vacuum degasification systems such as those described by Hussain (2001). Two-stages of vacuum degassing of water containing dissolved methane are demonstrated to be sufficient to remove more than 99% of the $CH_4$ present. Vacuum degassing systems removing gases from oils and waters are well known to practitioners of the art of industrial fluids degassing. They are widely utilized in several industries including oil production, recirculating system aquaculture and wastewater treatment. It is preferred for the apparatus to have the capability to degas and capture minimally 98% of the methane and minimally 90% of the $CO_2$ present as dissolved gas in the up-flow by a method of depressurization-exsolution degassing. This can be done by a combination of porting off gas exsolved below 20 meters depth followed by one or more stages of vacuum-pumping on water separated from gas in the upwelling bubbly flow and in chambers situated in above-surface locations.

The up-flow and degassing apparatus for total degassing as defined herein may incorporate one or more degassing catalyst technologies to promote the rapid transition of dissolved gas from dissolved to exsolved state in a depressurizing up-flow. Degassing catalysts may be helpful for time-efficient degassing of residually dissolved $CH_4$ such as may exist in degassing-resistant microbubbles present in natural waters which cause apparent supersaturation relative to expectations based on Henry's Law equilibria. Such effects can be common in natural waters from contaminant effects, such as bubble boundary concentrations of protein and lipid molecules.

Shown in FIG. 5 in schematic representation is a bubble capture system shown in two distinct types of device, with integration. Boxes 1 and 2 show bubble capture and transport by sloped pipes (6, 12) with gas exiting upwards into vertical collection pipes (7a,b). Bubble capture by sloped pipe is effective for large bubbles. The other type of bubble capture device shown (pipe 1 flowing into a unit labeled 2) utilizes flow through a packed bed (3) and is effective for capture of both large bubbles and microbubbles. The packed bed system device may or may not use bed packings with specialized coatings for promotion of bubble capture such as superhydrophobic coatings. A vertical flow partition is shown, labeled 13, directing all up-flow into the packed bed. Flow directions are indicated by arrows. Black arrows indicate flow that is mostly water. Arrows with light patterning indicate flows of bubbles and accumulated separated gas. Collected gas passes by upward buoyant flow through a pipe (4) controlled by a valve (5). Water level for intended function is shown by a horizontal dashed line (8) and is controlled by the gas exit valve (5). Exiting water flow in Box 1 is shown via a combination of a sloped pipe (6) and a horizontal pipe (9) of optionally variable lengths. Exiting flow, as shown in box 1, alternately could be via a pipe sloping upward with flow as is shown in box 2. Horizontal exit flow (9) is coupled to upward vertical pipe-flow (11) via a 90-degree coupling pipe section (10).

The two different methods or system for of bubble capture (sloped pipe and packed bed) may be utilized separately or in combination. Boxes 1 and 2 show modalities for simple sloped pipe bubble capture systems for large bubbles. One modality is shown as embodied in unit-exiting counter-flow (box 1) in a pipe descending in the direction of flow. Another modality is shown as a with-flow embodiment (box 2) where bubbles are captured along the top of an ascending pipe rising in the direction of flow. In both modalities for capturing large bubbles, the physical principle is that of upward airflow along the top of a sloped pipe.

Bubble capture systems as shown in FIG. 5 are intended for preferential $CH_4$ extraction at depth. The purpose of removing degassed $CH_4$ at depth is to improve total CH4 extraction efficiency in the overall total degassing process (and not to avoid $CO_2$ as in systems following the staged UCB model). One or more systems would be located at depths roughly between 100 meters and 30 meters for upwelling Lake Kivu water sources in the MRZ. If multiple, these may be contained within a chambered vertical system, as shown in FIGS. 2 and 4 within chamber 4. Or, alternately, one or more systems at different depths may be coupled with extended horizontal transport by means of long sloped and/or horizontal pipes. Extended horizontal transport can be useful if coupling an offshore deep pipe to a shallow water platform and/or to land-based oxy-fuel turbine operations. The invention disclosed herein may or may not utilize specific systems as shown. The invention disclosed herein generally includes only bubble capture systems, if/as needed, to reach an overall efficiency target of $CH_4$ degassing greater than 98%.

The next component of the total degassing system is a device to catalyze $CO_2$ degassing rapidly at depth in order to optimize the kinetic energy of the auto-siphoning flow. Everyday experience with carbonated beverages shows that the rate of $CO_2$ degassing is extremely dependent upon catalysis. Well-known demonstrations are "beer tapping," Eepybird "Diet Coke and Mentos" experiments (see: Diet Coke and Mentos; Coffey et al., 2008.) Rodríguez-Rodríguez, et al. (2014) in particular has illuminated the three basic phases of the nucleation of fast $CO_2$ degassing in beer-tapping. Rodríguez-Rodríguez, et al. (2014) also demonstrated laser pulse induced nucleation leading to rapidly accelerated degassing. Liger-Belair et al., (2007), Polidori et al., (2008, 2009) and Beaumont et al., (2013) have described catalyzed bubble nucleation and associated vortex ring upwelling in etched champagne glasses.

FIG. 6 is a schematic view of two different type of degassing catalyst system for inducing rapid nucleation of $CO_2$ degassing in upward flow within a pipe. These are: (i) energy input either by pulsed laser input and/or by ultrasound waves (2a,b,c,d), and (ii) suspended (3a,b) insertion (3) of degassing-catalyzing surfaces within the direction of flow (as shown by arrows), either as vertical wires (4) and/or strips or sheets (5). An example of a very high efficiency degassing-catalyzing type of surface is the "superbiphilic" type of surface created and studied by Betz et al. (2013), Fan et al. (2014) and Cheng and Lu (2014). (These textured surfaces pattern together micro-regions of superhydrophilic and superhydrophobic regions in order to optimize convective degassing on the surface.) The invention disclosed herein may or may not utilize specific catalyst degassing systems as shown. The invention disclosed herein generally includes only catalyzed degassing, if/as needed, to reach an overall efficiency target of $CH_4$ degassing greater than 98%.

For $CO_2$, catalyzed degassing will increase the structure of the degassing flow to have more gas exsolution deeper in the flow than otherwise would be possible without the catalyst technology or technologies. Use of catalyst technologies to promote rapid degassing, when utilized, will be primarily for the purpose of optimizing the extraction of kinetic energy driven by gas buoyancy in up-flows in pipes and chambers. The release and capture of buoyancy energy can add a new source into the overall energy capture calculus. $CO_2$ degassing can be strongly catalyzed. Spectacular effects from catalyzed degassing are well-known from the "ultrasonic soda fountain" (Bauer and Bauer, 2006) and the many demonstrations and online videos of the popular Diet Coke-and-Mentos experiments (Coffey, 2008; Huber and Massari, 2014, Volz and Grobe, 2012, 2013), and from "beer tapping" and related research (Rodriguez-Rodriguez et al., 2014, 2015).

It is preferred for the apparatus to degas and capture minimally 98% of the methane and minimally 90% of the $CO_2$ present as dissolved gas in the up-flow by methods of depressurization-degassing. Vacuum degassing technology well known to practitioners skilled in the art is well-demonstrated to provide this degree of degassing.

FIG. 7 is a schematic view of a power-recycling vacuum degasifier system. The vacuum degasifier is bounded by box 2. It is coupled to two turbine generators bounded by boxes 1 and 3. (These turbines are marked by propeller icons. These icons are shown sideways to their working orientation.) The top of the flow in this system is designed to be located at the top of the degassing system stack, close to and above the surface of the lake by roughly 7 meters. An up-flow pipe (1) contains an upward jet of bubbly flow. This flow is being pulled through a turbine by the effect of the vacuum pump shown by label 12. In one embodiment, the position of turbine's power transfer axle would be located in elevation at perhaps roughly ~30 meters of water plus ~7 meters of air above the depth of a degassing nucleation catalyst unit as shown in FIG. 6. In other embodiments, there may be multiple vacuum pumps as indicated by item 18, which could function with closure of valve 10 and with other modifications. The invention disclosed herein may or may not utilize specific sub-systems as shown in FIG. 7.

In FIG. 7, the top turbine (2) acts as a foam fractionator as well as for power generation for minor recapture of energy expended in vacuum pumping. The bottom turbine generator (14) is positioned in a pipe flow of water. It obtains the major component of recapture of energy expended in vacuum pumping.

This integration allows capturing and recycling kinetic energy of buoyancy from degassing in an upward depressurizing bubbly flow where (predominantly $CO_2$) degassing intensifies the energy carried by foam jetting as a consequence of depressurization from vacuum pumping (12).

The buoyancy of bubbles in a degassing up-flow provides a source of tappable energy different from the chemical energy of methane with respect to combustion. The up-flow and degassing apparatus for total degassing described herein may include one or more flow-driven turbines situated within the up-flow situated for the purpose of capturing kinetic energy generated by the buoyant bubble flow. Kinetic energy in the degassing flow will be boosted substantially by vacuum pumping at the top levels of the depressurization stack. Consequently, use of turbines for energy recapture can provide a means to decrease the total energy expended in vacuum pumping. Turbine capture of the kinetic energy in a rising bubbly flow also can be used as a liquid-gas separation process. It is preferred for the apparatus to degas and capture minimally 98% of the methane and minimally 90% of the $CO_2$ present as dissolved gas in the up-flow by a method of depressurization-degassing.

Technologies of catalyzed degassing, vacuum pumping and turbine capture of kinetic energy in a bubbly flow are described herein for purposes of clarifying efficiency optimization criteria included within the overall design of the invention. The total degassing design promotes high efficiency by avoiding methane loss: limited to less than 2%. This is a major advance. Loss or "slip" of methane from partial $CH_4$ degassing is a characteristic of previous methods typically at the level of 18% up to 40% or more. Therefore, a total degassing system adds 16% or more to total power yield.

A total degassing approach also has the capability to capture the kinetic energy of gas buoyancy in a pipe-bounded bubbly up-flow. For Lake Kivu, this is a small component of potential extra energy: roughly between 1% and 2% relative to the electrical energy available from combustion of methane. However, this form of capturable kinetic energy can be boosted substantially by additional pressure decrease of ~1 atmosphere from vacuum pumping at the top of the depressurization stack. For example, if this form of process energy recapture-recycling is more efficient than 50%, then in excess of 4% power will be recaptured, if, say, 8% of total electrical power produced was utilized for vacuum pumping in the degassing system.

Turbines recapturing power expended in vacuum pumping simultaneously can fractionate turbulent bubbly flow into separated water and gas streams, thereby doing double duty as foam fractionation devices.

As shown in FIG. 7, power is extracted from the kinetic energy of the foam jet up-flow by means of a hydro-turbine (2). This turbine, however, mostly functions at low compression as a foam-fractionator. A second turbine (14) and associated generator (15) functions as a more substantial source of power recovery recycling. The second turbine (14) sits in a fully degassed, bubble-free, water flow, functioning as a hydro-turbine. It extracts energy from the total return flow that is releasing gravitational potential energy by flowing down a vertical head (17), with the level of the exit flow (16) being close to the level of the water source (Lake Kivu in most embodiments). For effective degasification in the packed bed (7) from vacuum pumping, the height of this vertical head is expected to be a substantial fraction, say ~75%, of ~0.85 bar of pressure in water column height: ~6.6 meters in some embodiments. (Average atmospheric pressure at the 1460 meter elevation of Lake Kivu is ~0.85 bar.) Both turbines transfer energy in the usual manner by a shaft coupling turning a generator identified by the icon of a gear (3). Water and gas exiting the top-level turbine (2) passes through a froth separator (4). The combination of the turbine (2) followed by a froth separator (4) fractionates gas and water flow gravitationally. Both enter the top of the vacuum degasifier (8) in a fractionated flow with gas above (5a) and water below (5b). The flow of water is spread to pool over a large-area water spreader distribution box (6). This box spreads and directs water flow to fall in thousands of small pouring streams through a large-area perforated horizontal sheet. Water falls through the perforations in the bottom of the box onto the top of a horizontally extended packed bed (7). Water flows downward by thin film flow on surfaces of the packing material through the bed in a percolation. Water flowing in this manner is exposed in a thin layer situation to the vacuum-pumped atmosphere pervading the packed bed and being removed from it by vacuum pumping. This thin-layer degassing step under a vacuum-pumped atmosphere removes residual $CH_4$. The dynamically flowing gas atmosphere being degassed from the flowing water film is comprised of evaporating water vapor and $CO_2$ and residual $CH_4$.

As shown in FIG. 7, degassed gas and water vapor are pumped out of the system and into the combustion preparation cycle by the vacuum pump (12, or pumps if additional pumps are used). Pressure and gas flow balancing is provided by valves in locations 10 and 13. Degassed gas flows through the system bounded on top by a containing wall (11a,b) under valve control (10). Degassed return flow water exits the vacuum degasifier via a downpipe (9) through the second turbine and out a horizontal exit pipe (16).

The invention disclosed herein may or may not utilize specific sub-systems as shown in FIG. 7. Those skilled in the art can recognize that a vacuum degasifier system could dispense with the packed bed (7) component of the system, or that a 2-stage vacuum degasifier system could be created by closing valve 10, adding an additional vacuum pump as shown in location 1, and modifying the perforations in the bottom of the water spreader shown as item 6. Many options exist in order to combine a vacuum degasifier function into the top of a degassing stack.

As shown in FIG. 7, power generated by both flow turbines (2, 14) together is recycled back into as input into the power source tapped for vacuum pumping. Power recycling is expected to recover ~50% of the power input into the vacuum pump. The invention disclosed herein only includes vacuum degassing with flow percolating through a packed bed, if/as needed, to reach an overall efficiency target of $CH_4$ degassing greater than 98%.

Preferred embodiments of the invention remove more than 90% of $CO_2$ from deep water return flow flowing out of diffusers (FIG. 2, items, 16 and 17, and FIG. 4, item 23). This optimizes the safety of lakes at risk of limnic eruptions such as may be triggered by lake bottom volcanism that can produce lethally asphyxiating $CO_2$ blanketing and mass catastrophe. The process of carbon dioxide removal over time from the deep water trapping layer decreases three components of danger: (i) the probability (technically the perturbation sensitivity) of a limnic eruption, especially of the volcanically triggered type, (ii) the convective eruption power of a limnic eruption including its horizontal tendency to expand rapidly in extent, and (iii) the scale capacity of a limnic eruption to asphyxiate living beings by $CO_2$ blanketing. In the case of Lake Kivu, this aspect of safety improvement offers a way to remove a degree of hazard slowly increasing over time and that threatens at least two million human lives. This matter is serious and its remedy is extremely important and desirable.

The invention offers improved energy extraction efficiency measured in its core components as a net output energy production efficiency measure, A, defined as a product, $A=D(\eta_e)(1-X_p)$, composed of three factors, where D is defined as methane degassing extraction efficiency relative to the dissolved amount of $CH_4$ processed through deepwater intake, and where $\eta_e$ is the power plant electrical energy conversion efficiency for methane input fuel, and $X_p$ is the fraction of produced output power used up internally in process operations such as the water pumping operation of water washing towers for carbon dioxide scrubbing in the staged Belgian-type technology, or vacuum pumping in the case of total degassing technology.

The invention disclosed herein optimizes efficiency. Methane extraction efficiency, D, is between 0.98 and 1.00. This may be compared to factors typically lower than 0.8 in conventional technology of the type pioneered by UCB in the 1950s. Electricity production energy conversion efficiency, $\eta_e$, can be between 0.45 and 0.50 for new oxy-fuel systems (including internal ASU energy consumption). And the energy output efficiency factor measuring internal power use, $(1-X_p)$, is expected to be higher than 0.95 for a total degassing system such as one with energy expenditure for vacuum pumping recycled by turbine capture of kinetic energy in a buoyant upwelling bubbly flow. In cases of conventional technology, this factor appears to be lower than 0.90.

An additional fourth factor of efficiency applies to Lake Kivu operations because the "total degassing" aspect of the invention disclosed herein can degas and utilize substantial available $CH_4$ from lower concentration reserves in Lake Kivu, such as the PRZ and IZ shown in FIG. 8. Alternate technologies cannot. The efficiency gain from extracting extra methane from the PRZ and from part of the IZ may exceed a factor of a quarter: x1.25.

An additional fifth large factor of efficiency can apply from the shallow-level "push down" mode of return flow reinjection. This is by avoidance of dilution of the MRZ resource shown in FIG. 8. Over time, this dilutive reinjection of water degrades the extractability and efficiency of extraction of $CH_4$ from the MRZ. Such degradation roughly may be expected to decrease the effectively available $CH_4$ resource in the MRZ by at least 20%. The invention disclosed herein makes it possible to avoid dilution of the MRZ such that an efficiency factor of 1.0 can be applied relative to a factor of roughly 0.8 for conventional technology.

Overall, the comparative total efficiency difference in power production capacity from the invention disclosed herein is close to a factor of 2 in total electrical power output relative to existing methods. Power production capacity is defined herein as the amount of power producible from a fixed total amount of a limited natural resource, which in this case is $CH_4$ trapped as dissolved gas in Lake Kivu water layers below the base of the bio-zone (BZ) at ~70 meters depth. (See FIG. 8.)

Inefficiencies in energy production from Lake Kivu methane resources, with high associated carbon dioxide, can derive from at least five sources affecting conventional technology of the type initially created by UCB in the 1950s: (i) incomplete degassing of methane from deep water, typically via "slip" losses of methane from carbon dioxide separation processes; (ii) low thermal energy conversion efficiency in combustion, especially in conventional engines due to high $CO_2$ content in fuel gas; (iii) internal energy use from power needed to drive processes used to separate $CH_4$ from high levels of associated $CO_2$; (iv) inability to extract methane efficiently from lower grade resource layers (the PRZ and IZ), (v) progressive dilution-degradation of MRZ methane concentrations due to water flow reinjection, leading to losses late in the extraction process. The invention disclosed herein has the ability to solve any and all of these five problems associated with conventional technology. It therefore can produce at least double the power output from the limited $CH_4$ resource present in Lake Kivu.

The invention disclosed herein applies usefully to the design and execution of one or more large industrial projects combining "upstream" natural gas production with "downstream" power production using produced natural gas in the specific context of Lake Kivu and in the context of a specialized type of power generating unit connecting with a specialized type of degassing system. The information provided herein, in the context of what the invention is, is sufficient to enable appropriate persons skilled in the art to practice the invention without undue experimentation, though of course including all experimentation as is normal and appropriate to the actual proper and responsible completion of projects of the type the invention applies to.

The invention disclosed herein is not limited to preferred scales in terms of flow capacities for any extraction pipes, or degassing stacks, or bubble capture units, or degassing catalyst units, or for any specific vacuum degasifier units, with or without connected power recycling units, or for any return flow systems with outlet diffusers. Oxy-fuel turbine generators can have preferred scales based on efficiency, production by conversion of existing specific turbine models, and various commercial factors.

One possible oxy-fuel turbine scale for high efficiency produces roughly 400 megawatts of power. For continuous operation, and for estimates for the high efficiency performance of the method of the invention herein disclosed, the relationship between electric power output and deepwater input from the MRZ of Lake Kivu is: ~132,000 metric tonnes of methane per year per 100 megawatts (MW). This amount of fuel inflow corresponds to ~0.53 cubic kilometers per year of deepwater containing ~250 g methane per cubic meter. The corresponding rate of water processing is ~60,000 cubic meters of water per hour or ~17 cubic meters per second. It can be prudent for various reasons to utilize standard pipe sizes and implement systems of several extraction pipes rather than one giant large diameter pipe. With a pipe of 1.9 meters internal diameter, for example, an average flow velocity of 2 meters per second yields a flow-per-pipe of ~5.7 cubic meters per second. Three such extraction pipes are required in order to supply 100 MW, or ¼ of the full 400 MW output of the power generator system. Therefore an extraction array of 12 pipes of inside diameter 1.9 meters will be appropriate for the lower part of the extraction-degassing array between ~440 meters depth and ~40 meters depth. The coupling of such an array into degassing operations typically will integrate pipe-flow into a smaller number of upper-level vacuum degassing units such as three or two or one. This decision also may depend on standardization and on equipment transportation and construction criteria and decisions. More broadly, all such decisions may be influenced by concessionary and regulatory constraints.

While the invention has been described in detail and with reference to specific examples thereof, it will be apparent to one skilled in the art that various changes and modifications can be made therein without departing from the spirit and scope thereof.

REFERENCES CITED

1. Antares Offshore LLC, website: http://www.antaresoffshore.com/projects.php (showing an engineering diagram: http://www.antaresoffshore.com/images/kivuwattlarge.jpg; http://www.antaresoffshore.com/images/floaterimage6.jpg)
2. Bauer, J. E., and Bauer, M. B. (2006). The ultrasonic soda fountain: A dramatic demonstration of gas solubility in aqueous solutions. J. Chem. Educ. V. 83 (4): 577-580.
3. Baxter, P. J., Kapila, M., and Mfonfu, D. (1989). Lake Nyos disaster, Cameroon, 1986: medical effects of large scale emission of carbon dioxide. British Medical Journal, v. 298, pp 1437-1441.
4. Beaumont, F., Liger-Belair, G., and Polidori, G., (2013). Convective mass transfer in a champagne glass. Chapter 12 in: (ed. H. Nakajima), Mass Transfer—Advances in Sustainable Energy and Environment Oriented Numerical Modeling (Inchopen http://cdn.intechopen.com/pdfs-wm/43996.pdf)
5. Betz, A. R., Jenkins, J., Kim, C.-J., and Attinger, D., (2013). Boiling heat transfer on superhydrophilic, superhydrophobic, and superbiphilic surfaces. Int. J. Heat Mass Transfer, 57: 733-741.
6. Bikumu F. R., (2005). La problematique du deficit energetique dans la sous region des Grands-Las africains. (Online. Pole Institute)
7. Borgniez, G. (1960). Donnees pour la mise en valeur du gisement de methane du lac Kivu. Acad. Royale des Sciencesv d'Outre-Mer, classe de sciences techniques. Memoires 8, Nouvelle serie. Tome XIII, fasc. 1, 113 pp.
8. Capart, A., Godfrine, A., and Kufferath, J. (1957-1958). Le Gaz Methane du Lac Kivu. Ministere du Congo Belge et du Ruanda-Urundi, Zaire et Rwanda. Silent film. Titles in French.
9. Cheng, H-B., and Lu, Y-W., (2014). Applications of textured surfaces on bubble trapping and degassing for microfluidic devices. Microfluid. Nanofluid, DOI 10.1007s/10404-014-1368-0.
10. Coffey, T. S. (2008). Diet Coke and Mentos: What is really behind this physical reaction? Am. J. Phys., v. 76 (6): 551-557.
11. Contour Global website, KivuWatt: http://www.contourglobal.com/asset/kivuwatt Videos: https://vimeo.com/74334165; https://www.youtube.com/watch?v=N3PHPHyRxjE.
12. Costa, A. and Chiodini, G., (2015). Modeling Air Dispersion of $CO_2$ from Limnic Eruptions. In: D. Rouwet et al. (eds.) Volcanic Lakes, pp. 451-465.
13. Damas, H., (1937a). Recherches hydrobiologiques dans les Lacs Kivu, Edouard et Ndalaga. Imprint Hayez.
14. Damas, H., (1937b). La Stratification Thermique et Chimique des Lacs Kivu, Edouard et Ndaleger. Verh. Int. Ver. Theor. Angew Limnol. V 8. Pp. 51-68.
15. Descy, J-P., Darchambeau, F., Schmid, M., 2012 (editors). Lake Kivu: Limnology and Biochemistry of a Tropical Great Lake. Springer. 192 pp.
16. Diet Coke & Mentos. Wikipedia entry:
    a. http://en.wikipedia.org/wiki/Diet_Coke_and_Mentos_eruption
    b. See also: Eepybird website and video:
    c. http://www.eepybird.com/featured-video/the-extreme-diet-coke-mentos-experiments/
17. Docherty, M. G., (1981). Natural gas production from hydropressured aquifers. Institute of Gas Technology. Paper presented at the International Conference on Small Energy Sources, September 1981. CONF-8109111-1.
18. Eby, G. N. and Evans, W. C., (2006). Taming the killer lakes of Cameroon. Geology Today, v. 22 (1): 18-22.
19. Fan, L-W., Li, J-Q., Li, D-Y., Zhang, L., and Yu, Z-T., (2014). Regulated transient pool boiling of water during quenching on nanostructured surfaces with modified wettability from superhydrophilic to superhydrophobic. Int. J. Heat Mass Transfer, 76: 81-89.
20. Godo Shigen Sangyo, Co., Ltd. Website: http://www.godoshigen.co.jp/english/
21. Griggs, J. (2004). "A Re-Evaluation of Geopressured Geothermal Aquifers as an Energy Resource." Master's Thesis, Louisiana State University. Online. 82 pp.
22. Halbwachs, Michel. Website: http://mhalb.pagesperso-orange.fr/kivu/eg/index.htm
23. Halbwachs, M. (2014). Limnological Engineering. (Slide deck presentation.) (On line: http://moletta-methanisation.fr/diaporama/S54Halbwachs.pdf)
24. Halbwachs, M., Sabroux, Grangeon, J., Kayser, G., Tochon-Danguy, J.-C., Felix, A., Beard, J.-C., Villevieille, A., Vitter, G., Richon, P., Wuest, A., & Hell, J., (2004). Degassing the 'killer lakes' Nyos and Monoun, Cameroon, EOS, Transactions AGU, v. 85, pp. 281-285.
25. Hecky, R., Reinthal, P. 2010. The late Pleistocene-Holocene History of the Lake Kivu Ecosystem. Slides given at: Tropical Rift Lake Systems: Integrated Volcanologic, Tectonic, and Biogeochemical, and Geohazard Assessment of Lake Kivu Gisenyi, Rwanda Jan. 13-15, 2010 (http://dirs.cis.rit.edu/taxonomy/term/26) www.cis.rit.edu/~axvpci/docs/Kivu/Hecky_Kivu%20presentation%20Gisenyi%20version%201.pdf
26. Henni, A. (2014). Technology could cut $CO_2$ cost sharply for enhanced oil recovery. JPT: Journal of Petroleum Technology, June 2014 technology update (Online: http://www.spe.org/jpt/article/6427-technology-update-21/)
27. Huber, C. J., and Massari, A. M. (2014). Quantifying the soda geyser. J. Chem. Educ. V. 91 (3): 428-431.
28. Hussain, M. A. (2001) Vacuum degasifier: Comprehensive modeling and simulation. Vacuum, v. 60, pp. 325-337.

29. Issa, Ohba, T., Fantong, W., et al. (2013). Contribution of methane to total gas pressure in deep waters at lakes Nyos and Monoun (Cameroon, West Africa). Geochemical J., v. 47: 349-362.
30. Kapteijn, P. K., Kutscha, E., and Perron, J., (2012). A Breakthrough Oxy-Fuel Technology for Cost-Effective $CO_2$-Enhanced Oil Recovery. Paper SPE 162541 presented at the Abu Dhabi International Petroleum Exhibition and Conference, Abu Dhabi, UAE, 11-14 November. (https://www.onepetro.org/conference-paper/SPE-162541-MS Also a slide deck: http://members.igu.org/old/IGU%20Events/igrc/igrc2011/igrc-2011-proceedings-and-presentations/oral-presentations/c/OP_C_2_Pieter_Kapteijn.pdf)
31. Kling, G. (undated online slide deck) "The Killer Lakes of Cameroon." http://globalchange.umich.edu/globalchange1/current/lectures/kling/killer_lakes/Killer_lakes_lecture.pdf
32. Kling, G. W.; Clark, M. A.; Wagner, G. N.; Compton, H. R.; Humphrey, A. M.; Devine, J. D.; Evans, W C.; Lockwood, J. P. et al. (1987). The 1986 Lake Nyos Gas Disaster in Cameroon, West Africa, Science 236 (4798): 169-75.
33. Liger-Belair G., Religieux J.-B., Fohanno S., Vialatte M.-A., Jeandet P., Polidori G., Visualization of mixing phenomena in champagne glasses under various glass-shape and engravement conditions, J. Agric. Food Chem 2007, 55, 882.
34. Limnic Eruption, Wikipedia entry: http://en.wikipedia.org/wiki/Limnic_eruption
35. Marsden, S. (1993). A survey of natural gas dissolved in brine. Pp, 383-400. In: The Future of Energy Gases. United States Geological Survey Professional Paper 1570. Editor: D. G. Howell.
36. Marsden, S. (1979). Natural gas dissolved in brine—a major energy resource of Japan. Soc. Petrol. Eng. Annual Fall Meeting paper. SPE8355. (online)
37. Marsden, S., and Kawai, K., (1965). Suiyoseitennengasu—A special type of Japanese natural gas deposit. American Association of Petroleum Geologists, v. 49, no. 3, pp. 286-295.
38. Moran, D., (2010a). Carbon dioxide degassing in fresh and saline water. I. Degassing performance of a cascade column. Aquacultural Engineering, v. 43, pp. 29-36.
39. Moran, D., (2010b). Carbon dioxide degassing in fresh and saline water. II. Degassing performance of an air-lift. Aquacultural Engineering, v. 43, pp. 120-127.
40. Osterdijk, H. and Hoencamp, T. (2012). Lake Kivu: Turning threat into prosperity. TCE, The Chemical Engineer, issue 852, June 2012, pp: 32-35.
41. (http://www.infrassure.com/images/uploads/user/TCE852kivuenergy.pdf)
42. Pasche, N. T., Mugisha, A., Rwandekwe, L., and Umutoni, A., (2010). Monitoring the effects of methane extraction in Lake Kivu. MININFRA Report, Kigali, Rwanda.
43. (www.lake-kivu.org/sites/default/files/Monitoring%20annual%20report%202010_final_0.pdf)
44. Polidori G., Beaumont F., Jeandet P., Liger Belair G., Artificial bubble nucleation in engraved champagne glasses, J. Visualization 2008, 11-4, 279.
45. Polidori G., Beaumont F., Jeandet P., Liger Belair G., Ring vortex scenario in engraved Champagne glasses, J. Visualization 2009, 12-3, 275
46. Rodríguez-Rodríguez, J., Sevilla, A., Martínez-Bazán, C., Gordillo, J. M. (2015). Generation of microbubbles with Application to Industry and Medicine. (Annual Review of Fluid Mechanics, v.47, pp. 405-429).
47. Rodríguez-Rodríguez, J., A Casado-Chacón, A., Fuster, A. (2014). Physics of beer tapping. Physical Review Letters 113 (21), 214501
48. Rosen, J. W., (2015) Lake Kivu's great gas gamble. Technology Review, Apr. 16, 2015. (http://www.technologyreview.com/photoessay/536656/lake-kivus-great-gas-gamble/)
49. Ross, K. A., (2013a). PhD Thesis (ETH—Zurich). The Effect of Subaquatic Volcanism on the Structure of Lake Kivu in the Albertine Rift, East Africa.
50. Ross, K. A., (2013b). Slides presented at the November Lake Kivu AVCOR (Active Volcanism & Continental Rifting) meeting.
51. Ross, K. A., Smets, B., De Batist, M., Hilbe, M., Schmid, M., Anselmetti, F. S., (2014). Lake-level rise in the late Pleistocene and active subaquatic volcanism since the Holocene in Lake Kivu, East African Rift. Geomorphology, 221: 274-285.
52. Ross, K. A., Schmid, M., Ogorka, S., Muvundja, F. A. and Anselmetti, F. S. (2015). The history of subaquatic volcanism recorded in the sediments of Lake Kivu: East Africa. J.Paleolimnol. DOI 10.1007/s10933-015-9842-6
53. Schmitz, D. M. and Kufferath, J., (1955). Problemes par la presence de gaz dissous dans les eaux profondes du lac Kivu. Academie Royales des Sciences Coloniales, Bulletin de seances nouvelles serie 1: 326-356.
54. Schmid, M., Tietze, K., Halbwachs, M. Lorke, A., McGinnis, D., and A. Wüest, A., (2004). How hazardous is the gas accumulation in Lake Kivu? Arguments for a risk assessment in light of the Nyiragongo Volcano eruption of 2002, Acta Vulcanol., 14/15, 115-121.
55. Schmid M, Halbwachs M, Wehrli B, and Wuest A., (2005). Weak mixing in Lake Kivu: New insights indicate increasing risk of uncontrolled gas eruption. G3 Research Letter 6: Q07009,
56. Sigurdsson, H.; Devine, J. D.; Tchua, F. M.; Presser, F. M.; Pringle, M. K. W.; Evans, W. C. (1987). "Origin of the lethal gas burst from Lake Monoun, Cameroun". Journal of Volcanology and Geothermal Research, 31: 1-16.
57. Tassi, F., Vaselli, O., Tedesco, D., Montegrossi2 G., Darrah, T., Cuoco, E., Mapendano, M. Y., Poreda, R., Delgado Huertas, A., (2009). Water and gas chemistry at Lake Kivu (DRC): Geochemical evidence of vertical and horizontal heterogeneities in a multibasin structure. G3: Geochemistry, Geophysics, Geosystems, v. 10(2), DOI: 10.1029/2008GC002191
58. Tietze, K., (1978). Geophysikalische Untersuchungen des Kivusees und seiner ungewohnlichen zur Methangaslagerstatte—Schichtung, Dynamik und Gasgehalt des Seewassers. (Doctoral) Dissertation Christian-Albrechts-Universitat Kiel. 149 pp.
59. Tietze, K., (1980a). The Genesis of the Methane in Lake Kivu (Central Africa). Geologische Rundschau, v. 69(2): 452-472.
60. Tietze, K., (1980b). The Unique Methane Gas Deposit in Lake Kivu (Central Africa)—Stratification, Dynamics, Genesis and Development. In: Unconventional Gas Recovery Symposium, SPE/DOE8957 (Society of Petroleum Engineers), pp. 275-288.
61. Tietze, K., (1992). Cyclic gas bursts: are they a "usual" feature of Lake Nyos and other gas-bearing lakes? In: Freeth et al., (eds), Natural Hazards in West and Central Africa. Earth Evolution Series, International Monograph Series on Interdisciplinary Earth Sciences Research and Applications, pp. 97-107.
62. Tietze, K. (2000). Lake Kivu Gas Development and Promotion-Related Issues: Safe and Environmentally Sound Exploitation. Final Report to the Ministry of Energy, Water and Natural Resources Unit for Promotion and Exploitation of Lake Kivu Gas. (Online available.)
63. Tietze, K. (2007). Basic plan for monitoring, regulating and steering exploitation of the unique methane gas deposit in Lake Kivu: Safely, Environmentally soundly and with optimal yield. Copyright, PDT GmbH/Dr Klaus Tietze, Celle, Germany. 201 pages.
64. Volz, S., and Grobe, F., (2013). How To Build A Hovercraft: Air Cannons, Magnetic Motors, and 25 Other Amazing DIY Science Projects. (Chronicle Books), 190 pp.
65. Volz, S., and Grobe, F., (2013). The Viral Video Manifesto. (McGraw-Hill Education), 240 pp.
66. Wauthier, C., Cayol, V., Kervyn, F., and d'Oreye, N., 2012. Magma sources involved in the 2002 Nyiragongo eruption, as inferred from an InSAR analysis. J. Geophys. Res., Solid Earth 119, B05411 DOI: 10.1029/2011JB008257.
67. Wuest, A., Jarc, J., Schmid, M., (2009). Modeling the reinjection of deep-water after methane extraction in Lake Kivu. EAWAG Report (Kastanienbaum, Switzerland) (Available online on Researchgate.)
68. Wuest, A., Jarc, L., Burgmann, H., Pasche, N. and Schmid, M., (2012). Methane Formation and Future Extraction in Lake Kivu. In: J.-P. Descy et al. (eds.), *Lake Kivu: Limnology and Biochemistry of a Tropical Great Lake*. Aquatic Ecology Series v. 5. Springer.
69. Zhang Y (1996) Dynamics of $CO_2$-driven lake eruptions. Nature, 379:57-59
70. Zhang Y, Kling G W (2006) Dynamics of lake eruptions and possible ocean eruptions. Ann. Rev. Earth Planet Sci 34: 32-293

What is claimed is:

1. A method comprising the steps of:
extracting methane gas and carbon dioxide gas from a body of water to obtain extracted gases and degassed water;
feeding the extracted gases as a fuel into an oxyfuel power generation system;
generating power from the oxyfuel power generation system;
expelling an exhaust from the oxyfuel power generation system, wherein the exhaust comprises carbon dioxide and water vapor; and
replacing the degassed water into the body of water.

2. The method of claim 1, wherein the exhaust is recycled to industrial use.

3. The method of claim 1, wherein the danger of the body of water is decreased thus increasing human safety in proximity to the body of water.

4. The method of claim 1, wherein the oxyfuel power generation system includes an air separation unit.

5. The method of claim 1, wherein the body of water has a $CO_2/CH_4$ ratio greater than 4, and more than 98 wt. % of the $CH_4$ dissolved in the water is extracted by the extracting step.

6. A system configured to perform the method of claim 1, said system comprising:

a water degassing system;
a oxyfuel power generation system; and
a return flow system.

7. The system of claim 6, wherein the water degassing unit comprises:
an intake pipe system;
at least one bubble capture unit positioned upwards along a system of degassing pipes;
at least one degassing catalyst unit positioned further upwards along the system of degassing pipes;
a bubbly flow turbine configured to capture and recycle power from jetting foam flow at a top of the system of degassing pipes, wherein bubbly flow turbine is also configured to function as a foam separator;
at least one vacuum degassing unit positioned at the top of the system of degassing pipes; and
a water flow turbine capturing and recycling power in a downward outflow of degassed water from the vacuum degassing unit.

8. The system of claim 6, wherein the oxyfuel power generation system comprises a power generator and an air separation unit configured to provide oxygen for combustion.

9. The system of claim 6, wherein the return flow system comprises:
an outflow pipe from the degassing system;
pipe systems connecting flow to any water treatment systems;
a return flow pipe system and horizontal diffuser to reinject degassed water into the body of water at a specified depth; and
flow control valve systems with emergency shut-off capabilities.

10. The system of claim 9, which further comprises:
flow connection by pipes and channels to and from any surface water treatment systems that decrease water density in the degassed water flow; and
an inlet system configured to allow admixture of relatively low density near-surface water from the body of water into the return flow for reinjection at a specified depth.

11. The system of claim 6, which further comprises a system configured for combustion preparation processing and transfer of degassed gas into the oxyfuel power generation system.

12. The system of claim 6, which further comprises a control system configured for physical monitoring, system-wide functional integration and emergency response safety assurance.

13. The system of claim 6, which is configured to extract more than 98 wt. % of the $CH_4$ dissolved in a body of water having a $CO_2/CH_4$ ratio greater than 4.

* * * * *